United States Patent [19]

Tsuruta

[11] Patent Number: 4,614,985
[45] Date of Patent: Sep. 30, 1986

[54] RECORDING/REPRODUCED SIGNAL SWITCHING SYSTEM FOR A 4-HEAD TYPE RECORDING AND REPRODUCING APPARATUS

[75] Inventor: Masahiko Tsuruta, Yokohama, Japan

[73] Assignee: Victor Company of Japan, Ltd., Japan

[21] Appl. No.: 552,721

[22] Filed: Nov. 17, 1983

[30] Foreign Application Priority Data

| Nov. 18, 1982 | [JP] | Japan | 57-202600 |
| Nov. 18, 1982 | [JP] | Japan | 57-202601 |
| Nov. 18, 1982 | [JP] | Japan | 57-202602 |
| Nov. 18, 1982 | [JP] | Japan | 57-202603 |
| Nov. 18, 1982 | [JP] | Japan | 57-174443[U] |

[51] Int. Cl.⁴ .................. G11B 5/02; G11B 15/14
[52] U.S. Cl. ............................. 360/64; 360/84
[58] Field of Search .............. 360/64, 84, 85, 107, 360/108

[56] References Cited

U.S. PATENT DOCUMENTS

| 3,346,702 | 10/1967 | Heizer et al. | 360/64 |
| 3,536,856 | 10/1970 | Kietz et al. | 360/84 |
| 3,838,451 | 9/1974 | Mino | 360/64 |
| 4,197,562 | 4/1980 | Kikuya et al. | 360/64 |
| 4,358,799 | 11/1982 | de Niet | 360/84 |
| 4,364,098 | 12/1982 | Hirota et al. | 360/64 |

*Primary Examiner*—Raymond F. Cardillo
*Assistant Examiner*—Robert A. Weinhardt
*Attorney, Agent, or Firm*—Andrus, Sceales, Starke & Sawall

[57] ABSTRACT

A recording/reproduced signal switching system for a 4-head type recording and reproducing apparatus, comprises a circuit for rotating a rotary body which has four heads mounted equally spaced apart so that adjacent heads are separated by 90°, where a magnetic tape is wrapped around a peripheral surface of the rotary body over an angular range which is equal to or greater than 270° but less than 360°, a circuit for driving the tape to travel, four rotary transformers for performing transmission and reception of signals with respect to the four heads, four preamplifiers supplied with reproduced signals from the four heads, a first switch circuit for selectively and successively supplying a recording video signal to one of the four heads with a period which is approximately equal to a period in which the rotary body undergoes a 270°-rotation, a second switch circuit for subjecting input terminals of three of the four preamplifiers to A.C. grounding, a third switch circuit for selectively and succesively passing one of the four reproduced signals which are obtained through the four preamplifiers, and a circuit for supplying switching signals to the first through third switch circuits. The switching signals are formed based on a rotation detection pulse which is in synchronism with the rotational speed of the rotary body.

8 Claims, 58 Drawing Figures

RECORDING/REPRODUCED SIGNAL SWITCHING SYSTEM FOR A 4-HEAD TYPE RECORDING AND REPRODUCING APPARATUS

BACKGROUND OF THE INVENTION

The present invention generally relates to recording-/reproduced signal switching systems for 4-head type recording and reproducing apparatuses, and more particularly to a recording/reproduced signal switching system which switches a recording signal and successively supplies the recording signal to four rotary heads upon recording, and which switches signals which are reproduced from a magnetic tape by the rotary heads to produce a single continuous reproduced signal upon reproduction.

Generally, an existing helical scan type recording and reproducing apparatus (VTR) records a video signal by rotary heads onto tracks which are formed obliquely to the longitudinal direction of a magnetic tape upon recording, and reproduces the recorded signal from the tape upon reproduction. Among this type of a helical scan type VTR, there is a known 4-head type VTR in which four rotary video heads are equally spaced apart and mounted on a rotary body such as a rotary drum and a rotary plate, so that adjacent rotary video heads are spaced apart by 90°. In this 4-head type VTR, two mutually opposing rotary video heads have gaps of the same azimuth angle. In addition, the adjacent rotary video heads have gaps of mutually different azimuth angles. Certain conditions must be satisfied in order to form a tape pattern on the tape by the 4-head type VTR, so that the tape pattern is identical to a tape pattern which is formed on the tape by the existing VTR (hereinafter referred to as a 2-head type VTR) which carries out the recording and reproduction by use of two rotary video heads which are mounted diametrically on a rotary body. One condition which must be satisfied, is to select the azimuth angles of the gaps in the four rotary video heads to the same azimuth angles as the gaps in the two rotary video heads of the 2-head type VTR. Another condition to be satisfied, is to wrap the tape around the peripheral surface of the rotary body over an angular range of approximately 270°. Still another condition which must be satisfied, is to select the tape traveling speed so that the tape travels by one track pitch during one field period in which one rotary video head rotates by 270°.

If the above conditions are satisfied, the length of the tape which is in contact with the peripheral surface of the rotary body in the 4-head type VTR, becomes equal to the length of the tape which is in contact with the peripheral surface of the rotary body in the 2-head type VTR. In addition, the relative linear speed between the tape and the rotary video head in the 4-head type VTR becomes equal to the relative linear speed in the 2-head type VTR. As a result, one field of the video signal is successively recorded on one video track by the four rotary video heads, and it becomes possible to form a tape pattern on the tape which is completely the same as the tape pattern formed by the 2-head type VTR. Therefore, a compatible tape pattern is formed so that perfect compatibility can be ensured between the 2-head type VTR and the 4-head type VTR.

In the existing 2-head type VTR, the tape is wrapped around the peripheral surface of the rotary body over an angular range which is slightly larger than 180°, and the signal is recorded onto or reproduced from the traveling tape by the two rotary video heads. Hence, while one video head is scanning over the tape, the other video head is not in contact with the tape. For this reason, no problems will be introduced even if the recording current is continuously applied to both the video heads. Further, when carrying out the so-called interchanged reproduction in which a tape recorded by one VTR is reproduced by a different VTR, a part of the reproduced signal may become dropped out or a part of the reproduced signal may overlap, due to a deviation in the switching point of the two video heads between the two 2-head type VTRs. The dropout of a part of the reproduced signal or overlap of a part of the reproduced signal, may be prevented from occurring by wrapping the tape over an angular range which is larger than 180° by an angle in the order of 5, and by constantly applying the recording current to both the video heads. By taking these measures, the signal which is recorded immediately before one video head completes recording one track, is simultaneously recorded on a starting part of a subsequent track by the other video head. This measure is the so-called overlap recording.

On the other hand, in the case of the 4-head type VTR, three video heads including the video head which is actually carrying out the recording or reproduction, simultaneously make contact with the tape. Thus, a part of a scanning locus of one video head, overlaps with a scanning locus of another video head. Accordingly, the recording current cannot be constantly applied to the four video heads, as in the case of the 2-head type VTR. In the 4-head VTR, the recording current must be successively switched every time the rotary body undergoes a 270°-rotation, that is, every one field, so as to successively apply the recording current to only one of the video heads at one time.

Therefore, during the recording, switching must be successively performed so as to successively supply the video signal to only one of the four video heads at one time. Similarly, during the reproduction, switching must be successively performed so as to successively switch reproduced signal from the four video heads.

Conventionally, the above switching of the recording signal which is supplied to one of the video heads, and the switching of the reproduced signals from the video heads, were performed by use of relay switches. However, in the 4-head type VTR, the switching must be performed at a high speed which is in the order of one field period intervals and the like. Hence, the use of relay switches in the 4-head type VTR is inconvenient in that chattering is introduced, and the durability of the relay switches became a problem.

The switching of the recording signal which is supplied to one of the video heads, and the switching of the reproduced signals from the video heads, were performed in accordance with a head switching signal. In the existing 2-head type VTR, the head switching signal is a square wave signal. This square wave signal has a duty cycle of 50% and a repetition frequency of 30 Hz, for example, and is obtained based on a pulse which is produced every time the rotary body which is mounted with the two video heads undergoes one revolution. If the scanning period of the first video head corresponds to a low-level period of this square wave signal and the scanning period of the second video head corresponds to a high-level period of this square wave signal, the rotational phases of the heads and the rotary body can be determined. Hence, during the reproducing mode of the 2-head type VTR, it is possible to alternately switch the reproduced signals from the two video heads according to a rotation detection pulse which is obtained by detecting the rotational phase of the rotary body.

On the other hand, in the 4-head type VTR, the rotary body rotates at a rotational speed of 45 rps, for example. However, the four video heads only scan over the tape during a period corresponding to approximately 270°-rotation of the rotary body (approximately ¾ rotational period), and the heads are not in contact with the tape during a period corresponding to approximately 90°-rotation of the rotary body (approximately ¼ rotational period). Accordingly, the phase of the video heads and the rotational phase of the rotary body do not coincide. Therefore, there was a disadvantage in that the rotation detection pulse which is obtained by detecting the rotational phase of the rotary body, could not be used to successively switch the reproduced signals from the four video heads.

Furthermore, if the switching is performed in the 4-head type VTR so that the recording current is successively applied to one of the four video heads for every one field period, there was a problem in that the the signal which is reproduced from a part which is in the vicinity of the switching point of the heads may become dropped out during the interchanged reproduction described before.

SUMMARY OF THE INVENTION

Accordingly, it is a general object of the present invention to provide a novel and useful recording/reproduced signal switching system for a 4-head type recording and reproducing apparatus, in which the above described disadvantages have been eliminated.

Another and more specific object of the present invention is to provide a recording/reproduced signal switching system for a recording and reproducing apparatus which is designed so that a magnetic tape is wrapped around a peripheral surface of a rotary body over an angular range which is slightly larger than 270°, four heads are equally spaced apart and mounted on the rotary body so that adjacent heads are spaced apart by 90°, and recording and reproduction are carried out by rotating the rotary body at a rotational speed such that the rotary body undergoes a 270°-rotation during a period which corresponds to 1/n times one field period of a video signal which is recorded and reproduced, where n is a natural number. The recording/reproduced signal switching system comprises four independently controlled electronic switches which are respectively coupled to inputs of four preamplifiers to which reproduced signals from the four heads are independently supplied. The recording/reproduced signal switching system is designed so that one of the four electronic switches which is provided in a transmission path of a reproduced signal which is to be obtained from one head is turned OFF during a 270°-rotation period of the rotary body, and the remaining three electronic switches are respectively turned ON to cut off the inputs to the three preamplifiers during this 270°-rotation period of the rotary body. According to the system of the present invention, it is possible to obtain the reproduced signal from a predetermined one of the three heads which simultaneously scan over the tape. The switching can be performed at a high speed without introducing chattering upon switching, because electronic switches are employed. Moreover, the serviceable life of the system according to the present invention is extended compared to a system which employs relay switches, because the system of the present invention does not use switches with mechanical contacts. In addition, the four electronic switches can be used to perform both the switching during the recording mode and the switching during the reproducing mode of the recording and reproducing apparatus, and the number of parts which are required is small. Further, a switching signal generating circuit may have a simple circuit construction, because satisfactory recording can be carried out upon recording by controlling the four electronic switches which are provided between an output of a recording amplifier and four rotary transformers, with a timing identical to the control timing which is used upon reproduction.

Still another object of the present invention is to provide a reproduced signal switching system comprising means for producing a rotation detection pulse which is synchronized with the rotational phase of the rotary body, frequency dividing means for frequency-dividing the rotation detection pulse and for producing a first signal which has a period approximately equal to three times one rotational period of the rotary body and a second signal which has a period approximately equal to 3/2 times one rotational period of the rotary body, and switching means for successively switching and selectively producing each of the reproduced signals from the four heads in response to the first and second signals, or in response to four kinds of pulses with a duty cycle of approximately 25%, which four kinds of pulses are formed from the first and second signals to have the same period as the first signal and have phases which mutually differ by 90°. According to the system of the present invention, each of the reproduced signals from the four heads can successively and cyclically be switched for every predetermined period. Thus, it is possible to reproduce a time-continuous video signal from the tracks which are formed obliquely to the longitudinal direction of the tape, without crosstalk.

A further object of the present invention is to provide a recording/reproduced signal switching system comprising means for producing a rotation detection pulse by detecting the rotational phase of the rotary body, frequency dividing means for frequency-dividing the rotation detection pulse and for producing a signal which has a period approximately equal to three times one rotational period of the rotary body, and switching means supplied with an output signal of the frequency dividing means as a reference signal, for generating a switching signal which causes successive switching so as to selectively supply the video signal to one of the four video heads for every predetermined period during the recording mode, and for generating a switching signal which causes successive switching so as to selectively pass and produce the reproduced signal from one of the four heads for every predetermined period during the reproducing mode. According to the system of the present invention, the four heads are successively and cyclically used to record signals such as the video signal, and it is possible to form a tape pattern on the tape which is identical to the tape pattern formed by the existing 2-head type recording and reproducing apparatus, so that perfect tape compatibility is ensured between the 2-head type recording and reproducing apparatus and the 4-head type recording and reproducing apparatus. Moreover, the signals which are recorded on the tape by the existing 2-head type recording and reproducing apparatus, can be perfectly reproduced by the 4-head type recording and reproducing apparatus which employs the recording/reproduced signal switching system according to the present invention.

Another object of the present invention is to provide a recording/reproduced signal switching system comprising four independently controlled switches respectively provided between an output of a recording amplifier and inputs of the four heads. During the recording mode, the switching control is carried out so that the four switches are successively turned ON for a period which is slightly longer than a period corresponding to a natural number multiple of one field period of the video signal which is to be recorded, so as to supply the output video signal of the recording amplifier to one of the heads which is coupled to the switch which is turned ON, and so that a predetermined period at the end of a period in which one of the four switches is to be turned ON overlaps with a predetermined period at the beginning of a period in which another switch is to be turned ON subsequently. During the reproducing mode, the switching control is carried out so that all four of the above independently controlled switches are kept OFF. According to the system of the present invention, it is possible to record a video signal which is in the same section, during the predetermined period at the end of the period in which a certain track is formed by one head, and also during the predetermined period at the beginning of the period in which an adjacent track is subsequently formed by another head, in an overlapping manner. Accordingly, it is possible to prevent a part of the reproduced video signal from becoming dropped out at a part which is in the vicinity of a head switching point, even when the tape which is recorded by the 4-head type recording and reproducing apparatus employing the system of the present invention is played in a different recording and reproducing apparatus. Further, because the four switches which selectively supply the recording video signal to one of the four heads are all kept OFF during the reproducing mode, it is possible to prevent crosstalk due to ON-resistances of electronic switches which provide A.C. grounding of terminals of four rotary transformers supplied with the signal from the recording amplifier, where the four rotary transformers are provided correspondingly to the four heads.

Other objects and further features of the present invention will be apparent from the following detailed description when read in conjunction with the accompanying drawings.

DETAILED DESCRIPTION

Figure 1:
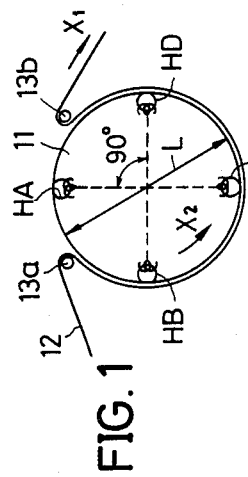
FIG. 1 shows an arrangement of heads in a 4-head helical scan type recording and reproducing apparatus which is applied with a system according to the present invention.

First, description will be given with respect to the arrangement of heads, scanning loci of the heads, and the like, in a recording and reproducing apparatus (VTR) which is applied with a recording/reproduced signal switching system according to the present invention. In FIG. 1, a rotary body 11 which may assume the form of a rotary drum or a rotary plate, for example, has a diameter L. This diameter L of the rotary drum 11, is selected to $\frac{2}{3}$ the diameter of the rotary drum in the existing 2-head helical scan type recording and reproducing apparatus (VTR). The rotary body 11 is rotated counterclockwise (the direction indicated by an arrow $X_2$) at a rotational speed (45 rps, for example) which is related to the field frequency of the video signal which is to be recorded and reproduced, by a motor (not shown). Recording and reproducing magnetic heads (video heads) HA, HB, HC, and HD are equally spaced apart and mounted on the rotary body 11, so that adjacent video heads are spaced apart by 90°. The video heads HA and HC have gaps of the same azimuth angle, and the video heads HB and HD have gaps of the same azimuth angle. The video heads HA and HB have gaps of mutually different azimuth angles.

By taking into accounr the angle required to carry out the overlap recording described before, a magnetic tape 12 is guided by guide poles 13a and 13b and wrapped obliquely around the peripheral surface of the rotary body 11 over an angular range which is greater than 270° and less than 360°. This angular range over which the tape 12 is wrapped around the peripheral surface of the rotary body 11, is selected so as not to interfere with the tape travel, and so that the tape 12 can be loaded automatically. The diameter L of the rotary drum 11 is equal to $\frac{2}{3}$ the diameter of the rotary body in the existing 2-head type VTR, and is small. The tape 12 is driven in a state where the tape 12 is pinched between a capstan (not shown) and a pinch roller (not shown), to travel in the direction of an arrow $X_1$. The traveling speed of the tape 12 is selected so that the tape 12 travels by one track pitch while one of the video heads HA, HB, HC, and HD rotates by an angle which is slightly larger than 270° at a rotational speed of 45 rps.

Accordingly, the length of the tape 12 which is in contact with the peripheral surface of the rotary body 11, is equal to the length of the tape which is in contact with the peripheral surface of the rotary body in the existing 2-head type VTR. As a result, the loci of video tracks which are formed on the tape 12, is identical to the loci of the video tracks which are formed in the existing 2-head type VTR. In addition, the relative linear speed between the tape and the head, is identical to the relative linear speed obtained in the existing 2-head type VTR. A video signal having a field frequency of 60 Hz (or 59.94 Hz) is successively recorded at a rate of one field in one track, as will be described later on in the specification, and the resulting tape pattern on the tape 12 is identical to the tape pattern which is obtained in the existing 2-head type VTR so as to ensure perfect tape compatibility between the 4-head type VTR which is applied with the system according to the present invention and the existing 2-head type VTR.

When recording or reproducing a video signal having a field frequency of 50 Hz at a rate of one field in one track, it is obvious that the rotary body 11 is rotated at a rotational speed of 37.5 rps.

Figure 2:
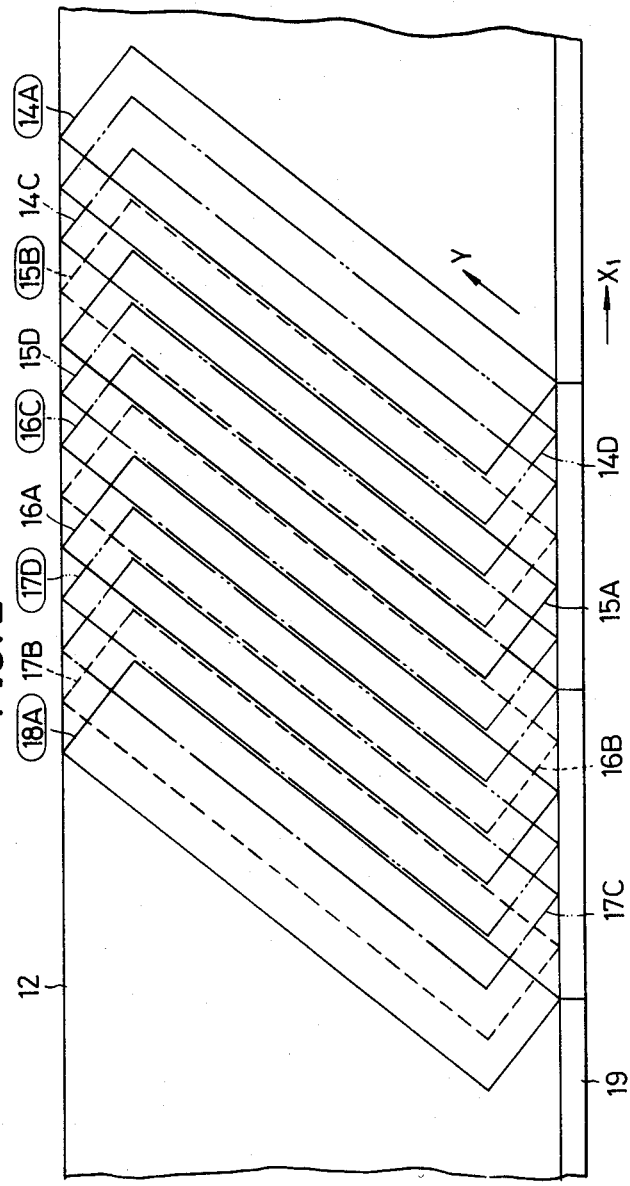
FIG. 2 shows a tape pattern on a tape, illustrating scanning loci of the heads shown in FIG. 1.

The scanning loci of the four video heads HA, HB, HC, and HD in the 4-head type VTR described heretofore, are shown in FIG. 2. As clearly seen from FIG. 2, the scanning loci of the four video heads HA, HB, HC, and HD are different from the scanning loci of the two video heads in the existing 2-head type VTR. If the video head HA assumes a location near the guide pole 13a and starts to scan over the tape 12, a scanning locus indicated by a solid line 14A in FIG. 2 begins to be formed. When the video head HA scans over approximately $\frac{1}{3}$ the scanning locus 14A, the video head HD which lags the video head HA by 90° with respect to the rotating direction of the rotary body 11 starts to make contact with the tape 12. Further, when the video head HA scans over $\frac{2}{3}$ the scanning locus 14A, the video head HC starts to make contact with the tape 12. At a point when the video head HA completes scanning over the scanning locus 14A, the video head HB starts to make contact with the tape 12. Accordingly, as the video head HA scans over the scanning locus 14A, the video head HD scans over a scanning locus indicated by a two-dot chain line 14D in FIG. 2 with a predetermined time lag, and the video head HC scans over a scanning locus indicated by a one-dot chain line 14C in FIG. 2 with a further predetermined time lag. The video head HB starts tc scan over a scanning locus indicated by a broken line 15B at the point when the video head HA completes scanning over the scanning locus 14A.

Similarly thereafter, scanning loci 15A, 15D, 16C, 16B, 16A, 17D, 17C, 17B, 18A, . . . are successively formed in this sequence by the heads HA, HB, HC, and HD. In FIG. 2, the track width of each of the tracks are illustrated as being equal to the track pitch, for convenience' sake. In addition, a control track 19 is formed along the longitudinal direction of the tape 12. For example, a control pulse is recorded on this control track 19 with a period which is equal to two fields.

Figure 3:
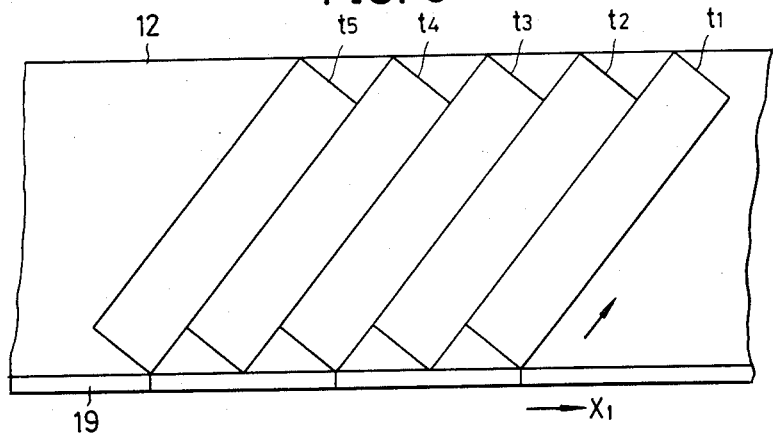
FIG. 3 shows a tape pattern in which the tracks are formed by the heads shown in FIG. 1.

In order to form a tape pattern which is identical to the tape pattern shown in FIG. 3 which is formed by the existing 2-head type VTR, the video signal is only supplied to the video heads which are scanning over the scanning loci 14A, 15B, 16C, 17D, 18A, . . . The reference numerals of these scanning loci 14A, 15B, 16C, 17D, 18A, . . . are encircled in FIG. 2. As a result, a track $t_1$ shown in FIG. 3 is formed by the head HA. Similarly, by switching the recording head in a sequence HB→HC→HD→HA→. . . for every period which is approximately equal to one field, video tracks $t_2, t_3, t_4, t_5, \ldots$ are formed in this sequence.

Hence, during the recording mode of the 4-head type VTR, the video signal must be successively switched and supplied to one of the four heads HA, HB, HC, and HD. Further, during the reproducing mode of the 4-head type VTR, the reproduced signals from the heads HA, HB, HC, and HD must successively be switched so as to obtain only one reproduced signal from one of the heads HA, HB, HC, and HD at one time.

Figure 4:
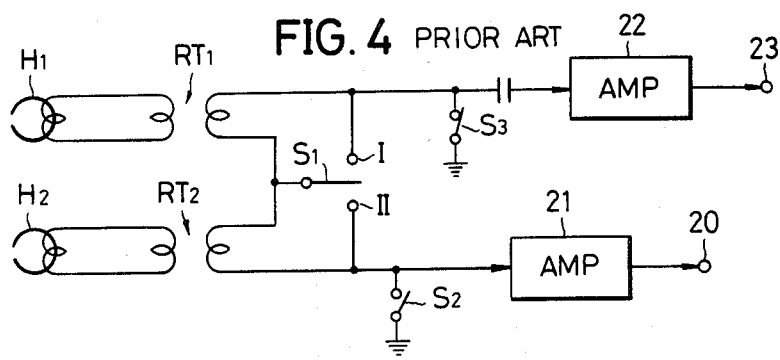
FIG. 4 is a systematic circuit diagram showing an example of a recording/reproduced signal switching system for an existing 2-head helical scan type recording and reproducing apparatus.

As a method of carrying out the switching of the heads, the switching system shown in FIG. 4 was conventionally employed in the existing VTRs. Such existing VTRs include the existing 2-head type VTR described before, a second type VTR which is provided with two heads for long-duration recording and reproduction in addition to the two heads which correspond to the two heads in the existing 2-head type VTR, and a third type VTR which is provided with two heads for special reproduction in addition to the two heads which correspond to the two heads in the existing 2-head type VTR. In the second type VTR, the two heads for long-duration recording and reproduction are respectively arranged at locations lagging the two heads which correspond to the two heads in the 2-head type VTR, by a specific angle (70°, for example) in the rotating direction of the rotary body. Moreover, the track width of the two heads for long-duration recording and reproduction, is smaller than the track width of the two heads which correspond to the two heads in the 2-head type VTR. On the other hand, in the third type VTR, the two heads for special reproduction are respectively arranged at locations leading the two heads which correspond to the two heads in the 2-head type VTR by a specific angle (70°, for example) in the rotating direction of the rotary body. Further, the two heads for special reproduction have gaps of the same azimuth angle, and the azimuth angle of these gaps is the same as the azimuth angle of the gap in either one of the two heads which correspond to the two heads in the 2-head type VTR. In addition, the track width of the two heads for special reproduction, is larger than the track width of the two heads which correspond to the two heads in the 2-head type VTR.

In FIG. 4, a switch $S_2$ is open (OFF) and a switch $S_3$ is closed (ON) during the recording mode. A video signal which is applied to an input terminal 20, is passed through a recording amplifier 21 and rotary transformers $RT_1$ and $RT_2$, and then supplied to a standard mode recording and reproducing head (or a special reproduction mode head) $H_1$ and to a long-duration mode recording and reproducing head (or a special reproduction mode head) $H_2$. During the standard mode recording, a switch $S_1$ is connected to a contact II to short-circuit the rotary transformer $RT_2$. On the other hand, during the long-duration mode recording, the switch $S_1$ is connected to a contact I to short-circuit the rotary transformer $RT_1$. During the reproducing mode, the switch $S_2$ is turned ON and the switch $S_3$ is turned OFF. During the standard mode reproduction, the switch $S_1$ is connected to the contact II. On the other hand, during the long-duration mode reproduction (or special reproduction mode), the switch $S_1$ is connected to the contact I. A reproduced signal is passed through a preamplifier 22, and produced through an output terminal 23.

However, the switches $S_1$ through $S_3$ are relay switches. Thus, when the switching must be performed at a high speed which is in the order of one field period intervals as in the case of the 4-head type VTR shown in FIG. 1, the relay switches are unfit for such a high-speed switching because of chattering which is introduced and the poor durability of the relay switches.

Further, although the rotary body 11 rotates at the rotational speed of 45 rps, for example, each of the video heads scan over the tape 12 only during a period corresponding to approximately 270°-rotation of the rotary body (approximately ¾ rotational period), and the heads are not in contact with the tape 12 during a period corresponding to approximately 90°-rotation of the rotary body (approximately ¼ rotational period). Accordingly, the phase of the video heads and the rotational phase of the rotary body 11 do not coincide. Therefore, the method of producing the head switching signal in the 2-head type VTR could not be applied to the 4-head type VTR so as to perform the switching.

Figure 5:
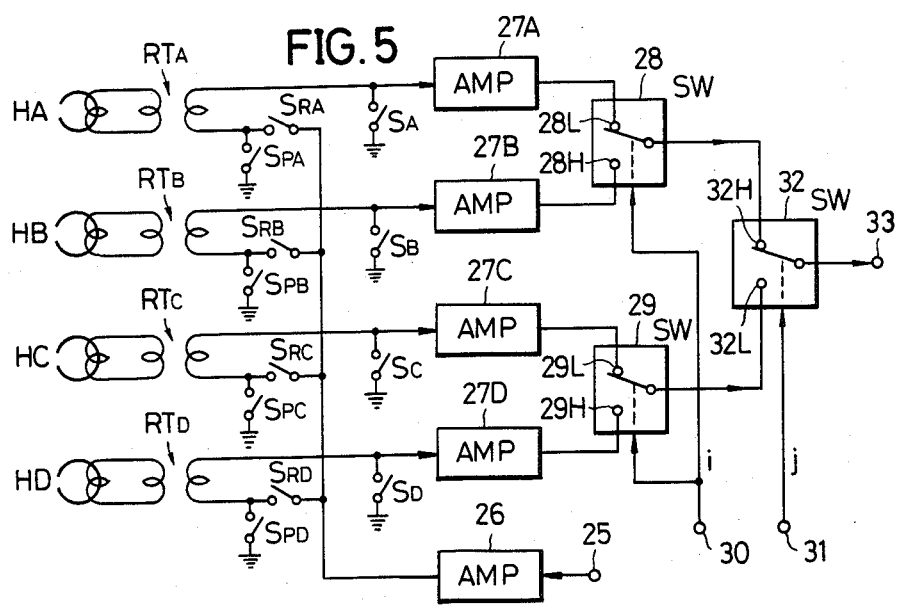
FIG. 5 is a systematic block diagram showing a first embodiment of a system according to the present invention.

FIG. 5 is a systematic block diagram showing a first embodiment of a recording system and a reproducing system in the recording/reproduced signal switching system according to the present invention in which the problems described heretofore have been eliminated. In FIG. 5, those parts which are the same as those corresponding parts in FIG. 1 are designated by the same reference numerals. In FIG. 5, opening and closing switches $S_{RA}$ through $S_{RD}$, $S_A$ through $S_D$, and $S_{PA}$ through $S_{PD}$ respectively are electronic switches as will be described hereinafter. However, because the switches $S_{PA}$ through $S_{PD}$ are kept OFF during the recording mode and kept ON during the reproducing mode and need not be switched at a high speed, these switches $S_{PA}$ through $S_{PD}$ may be relay switches.

During the recording mode, the switches $S_{PA}$, $S_{PB}$, $S_{PC}$, and $S_{PD}$ are respectively turned OFF. On the other hand, the switches $S_A$, $S_B$, $S_C$, and $S_D$ are respectively turned ON to shortcircuit inputs of preamplifiers 27A, 27B, 27C, and 27D to ground. An input video signal which is to be recorded, is applied to an input terminal 25. For example, this input video signal may be a signal in which a frequency modulated luminance signal and a frequency converted carrier chrominance signal are frequency-division-multiplexed, where the frequency modulated luminance signal is obtained by frequency-modulating a luminance signal which is separated from a standard color video signal, and the frequency converted carrier chrominance signal is obtained by frequency-converting a carrier chrominance signal which is separated from the standard color video signal into a band which is lower than the band of the frequency modulated luminance signal. The frequency converted carrier chrominance signal may be subjected to a phase shift as a countermeasure against crosstalk, as disclosed in a U.S. Pat. No. 4,178,606 in which the assignee is the same as the assignee of the present application.

The input video signal is passed through a recording amplifier 26, and applied to inputs of the switches $S_{RA}$, $S_{RB}$, $S_{RC}$, and $S_{RD}$. The switches $S_{RA}$, $S_{RB}$, $S_{RC}$, and $S_{RD}$ are made up from switching circuits which are controlled of their ON and OFF states by a switching signal, and outputs of these switching circuits are respectively coupled to the video heads HA, HB, HC, and HD through the rotary transformers $RT_A$, $RT_B$, $RT_C$, and $RT_D$. During the recording mode, the ON and OFF states of the switches $S_{RA}$ through $S_{RD}$ are independently controlled by pulses s, t, u, and v shown in FIGS. 9(S), 9(T), 9(U), and 9(V) which will be described later on in the specification. The switches $S_{RA}$ through $S_{RD}$ are respectively turned ON during a high-level period of corresponding pulses s through v, and turned OFF during a low-level period of corresponding pulses s through v.

On the other hand, during the reproducing mode, the switches $S_{PA}$ through $S_{PD}$ are respectively turned ON, to cut off transmission paths between the output of the recording amplifier 26 and the rotary transformers $RT_A$ through $RT_D$. Moreover, one end of each of the rotary transformers $RT_A$ through $RT_D$ is grounded, so that reproduced signals can be obtained from the rotary transformers $RT_A$ through $RT_D$. The switches $S_{RA}$ through $S_{RD}$ are made up from semiconductor switching elements, and have ON-resistances during their ON states. Such ON-resistances will cause crosstalk if the output of the recording amplifier 26 is commonly passed through the switches $S_{RA}$ through $S_{RD}$, and thus, the switches $S_{RA}$ through $S_{RD}$ are respectively turned OFF during the reproducing mode. Furthermore, the ON and OFF states of the switches $S_A$, $S_B$, $S_C$, and $S_D$ are independently controlled by pulses w, x, y, and z shown in FIGS. 9(W), 9(X), 9(Y), and 9(Z) which will be described later on in the specification, so that among the rotary transformers $RT_A$ through $RT_D$, one end of each of three rotary transformers which are coupled to three transmission paths which are not used upon reproduction is grounded.

Figure 6:
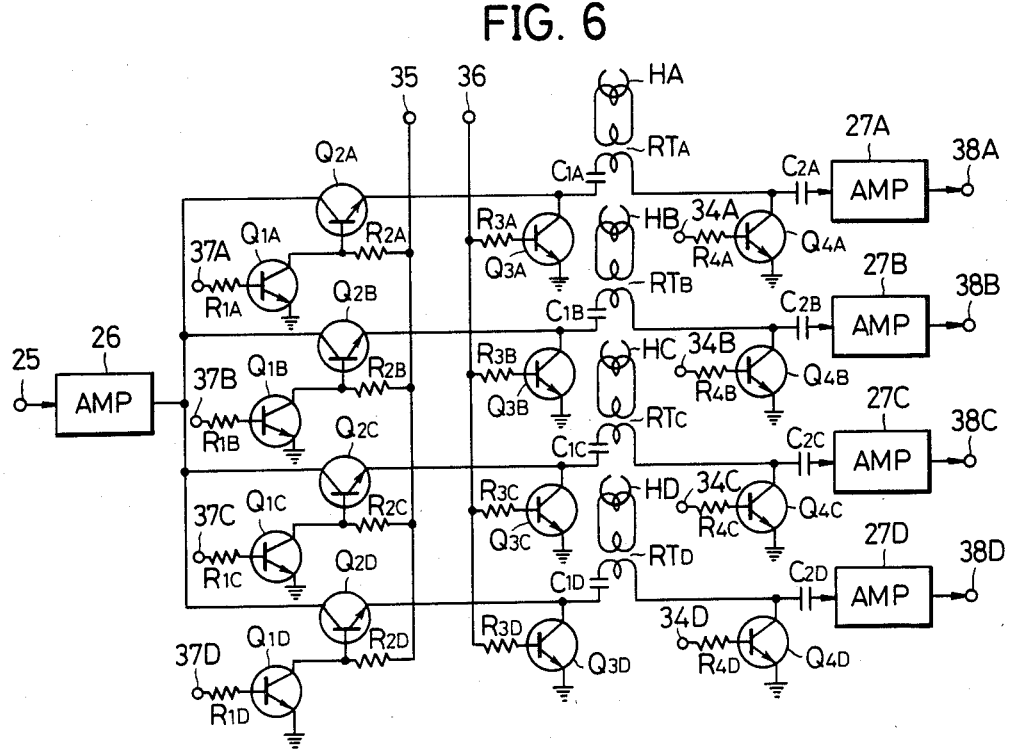
FIG. 6 is a circuit diagram showing an embodiment of an essential part of the system according to the present invention.

FIG. 6 is a circuit diagram showing a case where each of the switches $S_{RA}$ through $S_{RD}$, $S_A$ through $S_D$, and $S_{PA}$ through $S_{PD}$ are respectively made up from transistors. In FIG. 6, those parts which are the same as those corresponding parts in FIG. 5 are designated by the same reference numerals. In FIG. 6, switching NPN-type transistors $Q_{2A}$, $Q_{2B}$, $Q_{2C}$, and $Q_{2D}$ are respectively inserted in the four transmission paths which extend from the output of the recording amplifier 26 to the heads HA, HB, HC, and HD, with their emitters and collectors connected as shown. Connection points between the transistors $Q_{2A}$, $Q_{2B}$, $Q_{2C}$, and $Q_{2D}$ and corresponding coupling capacitors $C_{1A}$, $C_{1B}$, $C_{1C}$, and $C_{1D}$, are respectively coupled to collectors of corresponding switching NPN-type transistors $Q_{3A}$, $Q_{3B}$, $Q_{3C}$, and $Q_{3D}$. When switching from the ON state to the OFF state, the transistors $Q_{2A}$, $Q_{2B}$, $Q_{2C}$, and $Q_{2D}$ which make up analog switches are not easily switched to their OFF states because of accumulated carrier. Thus, bases of the transistors $Q_{2A}$, $Q_{2B}$, $Q_{2C}$, and $Q_{2D}$ are coupled to corresponding collectors of NPN-type transistors $Q_{1A}$, $Q_{1B}$, $Q_{1C}$, and $Q_{1D}$ in order to increase the switching speed.

The transistors $Q_{1A}$ and $Q_{2A}$ make up the switch $S_{RA}$ in FIG. 5. Similarly, the transistors $Q_{1B}$ and $Q_{2B}$ make up the switch $S_{RB}$, the transistors $Q_{1C}$ and $Q_{2C}$ make up the switch $S_{RC}$, and the transistors $Q_{1D}$ and $Q_{2D}$ make up the switch $S_{RD}$. In addition, the transistors $Q_{3A}$, $Q_{3B}$, $Q_{3C}$, and $Q_{3D}$ which have grounded emitters, respectively make up the switches $S_{PA}$, $S_{PB}$, $S_{PC}$, and $S_{PD}$.

Switching NPN-type transistors $Q_{4A}$, $Q_{4B}$, $Q_{4C}$, and $Q_{4D}$ which have grounded emitters, are respectively inserted in the four transmission paths which extend from the heads HA, HB, HC, and HD to the inputs of the preamplifiers 27A, 27B, 27C, and 27D through coupling capacitors $C_{2A}$, $C_{2B}$, $C_{2C}$, and $C_{2D}$ as shown. Collectors of the transistors $Q_{4A}$, $Q_{4B}$, $Q_{4C}$, and $Q_{4D}$ are respectively coupled to corresponding connection points between one end of each of the rotary transformers $RT_A$, $RT_B$, $RT_C$, and $RT_D$ and the coupling capacitors $C_{2A}$, $C_{2B}$, $C_{2C}$, and $C_{2D}$. These transistors $Q_{4A}$, $Q_{4B}$, $Q_{4C}$, and $Q_{4D}$ respectively make up the switches $S_A$, $S_B$, $S_C$, and $S_D$ shown in FIG. 5.

Description will now be given with respect to the operation of the circuit shown in FIG. 6 during the recording mode. High-level voltages are constantly applied to input terminals 34A, 34B, 34C, and 34D during the recording mode. These high-level voltages are respectively applied to the base of each of the transistors $Q_{4A}$, $Q_{4B}$, $Q_{4C}$, and $Q_{4D}$, through resistors $R_{4A}$, $R_{4B}$, $R_{4C}$, and $R_{4D}$, to turn each of the transistors $Q_{4A}$, $Q_{4B}$, $Q_{4C}$, and $Q_{4D}$ ON. At the same time, a high-level voltage is applied to an input terminal 35. This high-level voltage is applied to the collector of each of the transistors $Q_{1A}$, $Q_{1B}$, $Q_{1C}$, and $Q_{1D}$ and to the base of each of the transistors $Q_{2A}$, $Q_{2B}$, $Q_{2C}$, and $Q_{2D}$, through resistors $R_{2A}$, $R_{2B}$, $R_{2C}$, and $R_{2D}$. On the other hand, a low-level voltage is applied to an input terminal 36. This low-level voltage is applied to the base of each of the transistors $Q_{3A}$, $Q_{3B}$, $Q_{3C}$, and $Q_{3D}$, through resistors $R_{3A}$, $R_{3B}$, $R_{3C}$, and $R_{3D}$, to turn each of the transistors $Q_{3A}$, $Q_{3B}$, $Q_{3C}$, and $Q_{3D}$ OFF. Because the transistors $Q_{4A}$ through $Q_{4D}$ are respectively turned ON, the inputs of the preamplifiers 27A through 27D are subjected to A.C. grounding.

Pulses (w through z) which are obtained by inverting the polarities of the pulses s, t, u, and v shown in FIGS. 9(S), 9(T), 9(U), and 9(V), are respectively applied to input terminals 37A, 37B, 37C, and 37D. The pulses s, t, u, and v are formed based on a pulse which is obtained by frequency-dividing a rotation detection pulse which is produced by detecting the rotational phase of the rotary body 11 by $\frac{1}{2}$, as will be described later on in the specification. The pulses s, t, u, and v respectively have a period of four fields. The pulses applied to the input terminals 37A through 37D, are respectively applied to the bases of the transistors $Q_{1A}$, $Q_{1B}$, $Q_{1C}$, and $Q_{1D}$, through the resistors $R_{4A}$, $R_{4B}$, $R_{4C}$, and $R_{4D}$. As shown in FIGS. 9(S) through 9(V), the high-level period of each of the pulses s, t, u, and v is selected to a period (this period corresponds to a period in which the heads HA through HD rotate by an angle which is slightly larger than 270° to scan over the tape 12) which is slightly longer than one field period. Further, a predetermined period To at the end of a high-level period of the pulse s, overlaps with a predetermined period To at the beginning of a high-level period of the pulse t. Similarly, a predetermined period To at the end of a high-level period of the pulse t overlaps with a predetermined period To at the beginning of a high-level period of the pulse u, a predetermined period To at the end of a high-level period of the pulse u overlaps with a predetermined period To at the beginning of a high-level period of the pulse v, and a predetermined period To at the end of a high-level period of the pulse v overlaps with a predetermined period To at the beginning of a high-level period of the pulse s. That is, the relationships of the four kinds of pulses s through v are such that, between the pulses (s and t, for example) which mutually differ in phase by 90°, the rear edge of the pulse (s, for example) which leads in phase is generated after the predetermined period To has elapsed from the time when the front edge of the pulse (t, for example) which lags in phase is generated.

FIG. 9(A) diagrammatically shows each field period of the input video signal which is to be recorded. For example, the odd fields are indicated by high levels and the even fields are indicated by low levels.

The transistors $Q_{1A}$ through $Q_{1D}$ are respectively turned OFF during low-level periods of corresponding input pulses which are applied to the input terminals 37A through 37D. Hence, the collector potentials of the transistors $Q_{1A}$ through $Q_{1D}$ respectively assume high level, and the base potentials of the transistors $Q_{2A}$ through $Q_{2D}$ respectively assume high level. As a result, the transistors $Q_{2A}$ through $Q_{2D}$ are turned ON. On the other hand, the transistors $Q_{1A}$ through $Q_{1D}$ are respectively turned ON during high-level periods of corresponding input pulses which are applied to the input terminals 37A through 37D. Hence, the collector potentials of the transistors $Q_{1A}$ through $Q_{1D}$ respectively assume low level, and the base potentials of the transistors $Q_{2A}$ through $Q_{2D}$ respectively assume low level. As a result, the transistors $Q_{2A}$ through $Q_{2D}$ are turned OFF. The input pulses applied to the input terminals 37A through 37D, are shown in FIGS. 9(W) through 9(Z). Thus, the signals applied to the bases of the transistors $Q_{2A}$ through $Q_{2D}$ respectively become as shown in FIGS. 9(S) through 9(V). Therefore, the transistors $Q_{2A}$, $Q_{2B}$, $Q_{2C}$, and $Q_{2D}$ are successively turned ON for a period which is slightly longer than one field.

Accordingly, during the high-level period of the pulse s, which is slightly longer than one field, the input video signal which is obtained through the recording amplifier 26 is supplied to the head HA, through the transistor $Q_{2A}$, the capacitor $C_{1A}$, and the rotary transformer $RT_A$. During a subsequent period which is slightly longer than one field, the video signal is supplied to the head HB through the transistor $Q_{2B}$, the capacitor $C_{1B}$, and the rotary transformer $RT_B$. Similarly, the video signal is supplied to the head HC through the transistor $Q_{2C}$, the capacitor $C_{1C}$, and the rotary transformer $RT_C$ during a subsequent period which is slightly longer than one field, and the video signal is supplied to the head HD through the transistor $Q_{2D}$, the capacitor $C_{1D}$, and the rotary transformer $RT_D$ during a subsequent period which is slightly longer than one field. These operations are thereafter repeated cyclically.

The phases of the pulses s through v are set so that one of the heads HA through HD which is supplied with the video signal, scans over the tape 12. Hence, the video signal is successively recorded by the heads HA through HD on successive tracks. If it is assumed that the transistor $Q_{2A}$ is ON, this transistor $Q_{2A}$ and the transistor $Q_{2B}$ which is to be turned ON subsequently are respectively controlled so that the predetermined period To at the end of the ON period of the transistor $Q_{2A}$ overlaps the predetermined period To at the beginning of the ON period of the transistor $Q_{2B}$. As a result, the video signal which is in the same section, is simultaneously recorded by the heads HA and HB on two independent tracks, during the predererimned period To. In other words, the so-called overlap recording described previously, is carried out.

Similarly, the ends of the tracks which correspond to the predetermined period To and are formed by the heads HB, HC, and HD, are recorded with the video signal of the same section as the beginnings of the tracks which correspond to the predetermined period To and are formed by the heads HC, HD, and HA. Hence, as shown in FIG. 3, the tape pattern which is formed by the 4-head type VTR becomes identical to the tape pattern which is formed by the existing 2-head type VTR, so that tape compatibility is ensured between the 2-head type VTR and the 4-head type VTR.

Next, description will be given with respect to the operation of the circuit shown in FIG. 6 during the reproducing mode. A low-level signal is applied to the input terminal 35 during the reproducing mode, to keep the transistors $Q_{2A}$, $Q_{2B}$, $Q_{2C}$, and $Q_{2D}$ OFF. On the other hand, a high-level signal is applied to the input terminal 36, to keep the transistors $Q_{3A}$, $Q_{3B}$, $Q_{3C}$, and $Q_{3D}$ ON. Because the transistors $Q_{3A}$, $Q_{3B}$, $Q_{3C}$, and $Q_{3D}$ are respectively turned ON, one end of each of the rotary transformers $RT_A$, $RT_B$, $RT_C$, and $RT_D$ is subjected to A.C. grounding. As a result, although there is no direct crosstalk from the other heads, the transistor switch does have a ON-resistance, and crosstalk is introduced due to this ON-resistance of the transistor switch. Accordingly, in the present embodiment of the invention, the transistors $Q_{2A}$, $Q_{2B}$, $Q_{2C}$, and $Q_{2D}$ are kept OFF during the reproduction in order to eliminate such crosstalk.

In addition, the pulses w through z shown in FIGS. 9(W) through 9(Z) which respectively have a period of four fields and time-divisionally assume a low level for every one field, are applied to the input terminals 34A through 34D. Thus, the transistors $Q_{4A}$, $Q_{4B}$, $Q_{4C}$, and $Q_{4D}$ are time-divisionally turned OFF. When the head HA is scanning over the track upon reproduction, the pulse w which is applied to the input terminal 34A assumes low level so that the transistor $Q_{4A}$ becomes turned ON. Hence, the reproduced signal from the head HA passes through the rotary transformer $RT_A$, the capacitor $C_{2A}$, and the preamplifier 27A, and is obtained through an output terminal 38A. Similarly, the reproduced signals of one field from the heads HB, HC, and HD, are successively produced through output terminals 38B, 38C, and 38D. The signal level is low during the predetermined periods To at the ends of the pulses w, x, y, and z and the predetermined periods To at the beginnings of the pulses w, x, y, and z, as shown in FIGS. 9(W) through 9(Z). Therefore, the same video signal which is subjected to the overlap recording, is simultaneously reproduced by two heads during the predetermined period To.

Returning now to FIG. 5, the reproduced video signal which are produced through the output terminals 38A and 38B shown in FIG. 6, are respectively applied to terminals 28L and 28H of a switching circuit 28 shown in FIG. 5. The switching circuit 28 selectively passes one of the reproduced video signals, and supplies the passed reproduced video signal to a terminal 32H of a switching circuit 32H. On the other hand, the reproduced video signals which are produced through the output terminals 38C and 38D shown in FIG. 6, are respectively applied to terminals 29L and 29H of a switching circuit 29. The switching circuit 29 selectively passes one of the reproduced video signals, and supplies the passed reproduced video signal to a terminal 32L of the switching circuit 32.

At the same time as when the head HA starts to scan over the video track $t_1$ shown in FIG. 3, the switch $S_A$ ($Q_{4A}$) is turned OFF. In this state, the switches $S_B$ ($Q_{4B}$) and $S_C$ ($Q_{4C}$) are ON, and the switch $S_D$ ($Q_{4D}$) is OFF. The signal which is reproduced from the track $t_1$ by the head HA, passes through the rotary transformer $RT_A$, the preamplifier 27A, and the switching circuits 28 and 32, and is produced through an output terminal 33. The connection states of the switching circuits 28 and 32 are respectively controlled by a pulse i shown in FIG. 9(I) which will be described later on in the specification. This pulse i is obtained through a terminal 30. The switching circuits 28 and 32 are respectively controlled so as to pass the output signals of the preamplifiers 27A and 27C which are applied to the terminals 28L and 29L during the low-level period of the pulse i, and to pass the output signals of the preamplifiers 27B and 27D which are applied to the terminals 28H and 29H during the high-level period of the pulse i.

On the other hand, the connection state of the switching circuit 32 is controlled by a pulse j shown in FIG. 9(J) which will be described later on in the specification. This pulse j is obtained through a terminal 31. The switching circuit 32 is controlled so as to pass the output signal of the switching circuit 28 which is applied to the terminal 32H during the high-level period of the pulse j, and to pass the output signal of the switching circuit 29 which is applied to the terminal 32L during the low-level period of the pulse j. Accordingly, during the reproducing period of the head HA which will be described later, in which the pulses i and w assume low level and the pulse j assumes high level, the signal which is reproduced by the head HA is produced through the output terminal 33.

Figure 7:
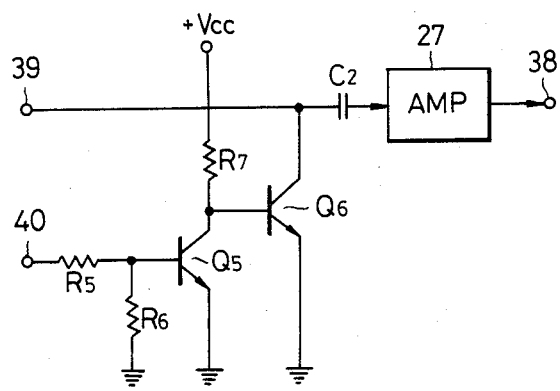
FIG. 7 is a circuit diagram showing another embodiment of an essential part of the system according to the present invention.

Next, description will be given with respect to a modification of the switches $S_A$ through $S_D$ described heretofore, by referring to FIG. 7. In FIG. 7, only a transmission path system with respect to one head is shown, however, three other circuits of the same circuit construction are actually provided.

One end of a rotary transformer is coupled to the input of a preamplifier 27, through an input terminal 39 and a coupling capacitor $C_2$. This end of the rotary transformer is also coupled to a collector of a switching NPN-type transistor $Q_6$. A collector of an emitter-grounded NPN-type transistor $Q_5$, is coupled to a base of the transistor $Q_6$. The transistor $Q_5$ is provided for the purpose of increasing the switching speed of the transistor $Q_6$. The switching speed of the transistor $Q_6$ becomes slow especially when switching from the ON state to the OFF state because of the accumulated carrier, however, this problem is eliminated by the provision of the transistor $Q_5$. The pair of transistors $Q_5$ and $Q_6$ corresponds to one of the switches $S_A$, $S_B$, $S_C$, and $S_D$ which were described before.

During the reproducing mode, a pulse is applied to an input terminal 40 in the circuit shown in FIG. 7. This pulse has a high-level pulse width which is approximately equal to the period in which the rotary body 11 rotates by 270°, and has a repetition frequency of 15 Hz. This pulse is subjected to voltage division by resistors $R_5$ and $R_6$, and then supplied to a base of the transistor $Q_5$. During the period in which the rotary body 11 rotates by 270° and a high-level pulse is applied to the input terminal 40 (a period which is slightly longer than one field in this case), the transistor $Q_5$ is turned ON. Consequently, the transistor $Q_6$ which has its base coupled to a connection point between the collector of the transistor $Q_5$ and a resistor $R_7$, is turned OFF.

One head is scanning over the tape 12 during the above period which is slightly longer than one field and in which the transistor $Q_6$ is OFF. In other words, this period in which the transistor $Q_6$ is OFF, corresponds to a reproducing period in which the recorded signal is reproduced from one track. The signal which is reproduced from the above one track, passes through the capacitor $C_2$ and the preamplifier 27, and is obtained through the output terminal 38.

Next, the pulse applied to the input terminal 40 assumes low level during a period which is slightly less than three field periods, and the transistor $Q_5$ is turned OFF during this period which is slightly less than three field periods. When the transistor $Q_5$ is turned OFF, the collector potential of the transistor $Q_5$ becomes high to turn the transistor $Q_6$ ON. As a result, the input of the preamplifier 27 is subjected to A.C. grounding through the capacitor $C_2$ and the collector and emitter of the transistor $Q_6$. Thus, even when the head which is coupled to the input terminal 39 through the rotary transformer is scanning over the tape 12 during a period in which a reproduced signal is obtained from one of the three remaining heads, the reproduced signal from the above one head which is coupled to the input terminal 39 will be cut off and therefore will not be supplied to the preamplifier 27. It is hence possible to prevent the occurrence of crosstalk.

During the recording mode, a low-level signal is applied to the input terminal 40. Accordingly, the transistor $Q_5$ is turned OFF, and the transistor $Q_6$ is turned ON.

In the present modification, the transistors $Q_5$ and $Q_6$ which are provided to eliminate the crosstalk, also make up a switching circuit for performing switching between the recording and reproducing modes. The provision of this switching circuit may make it unnecessary to provide the existing switching circuit in the VTR for performing the switching between the recording and reproducing modes. Further, the switching circuit which is made up from the transistors $Q_5$ and $Q_6$, may be used in common for other purposes. It is therefore possible to reduce the number of circuit parts which are required in the VTR.

Figure 8:
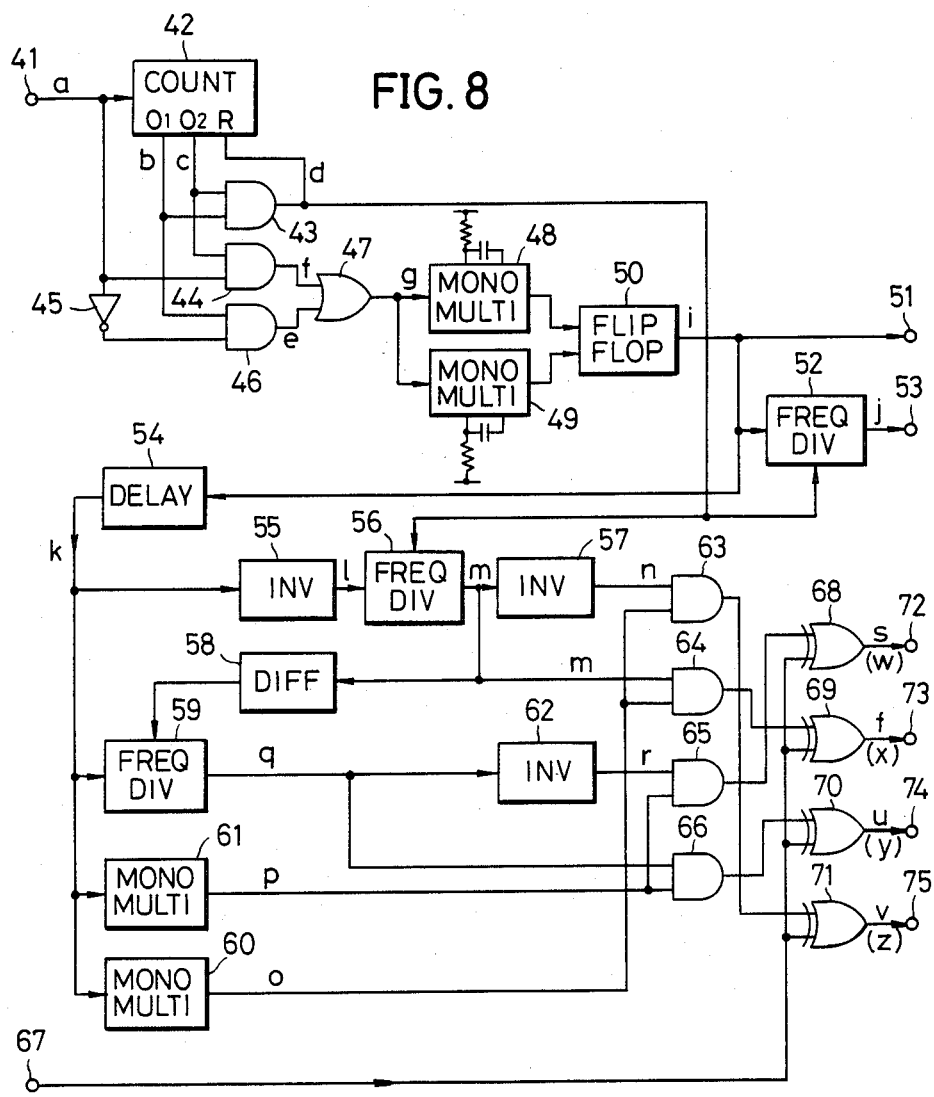
FIG. 8 is a systematic circuit diagram showing an embodiment of a circuit which generates switching signals in the system according to the present invention.

Next, description will be given with respect to a generating circuit which generates the switching signals which are applied to the input terminals 34A through 34D, 37A through 37D, 30, 31, and 40, by referring to FIGS. 8 and 9(A) through 9(Z). In FIG. 8, a rotation detection pulse which is in synchronism with the rotational phase of the rotary body 11, is applied to an input terminal 41. As a method of obtaining this rotation detection pulse, a light reflecting portion may be formed on half the rotating section of a rotary part which rotates unitarily with the rotary body 11 while forming a non-reflecting portion on the remaining half of the rotating section, for example. According to this method, a photosensor is provided opposing the rotating section of the rotary part, to detect the rotation of the rotary body 11. One rotation detection pulse is obtained for one revolution of the rotary body 11.

The rotation detection pulse a shown in FIG. 9(A) is a square wave having a duty cycle of approximately 50%. If the rotary body 11 rotates at the rotational speed of 45 rps, the repetition frequency of the rotation detection pulse a becomes equal to 45 Hz. That is, $\frac{3}{4}$ the period of the rotation detection pulse a is equal to the period in which the rotary body 11 rotates by 270°, and corresponds to one field period of the video signal which is to be recorded or reproduced. The pulse a is applied to a counter 42 wherein the pulse is counted. The counter 42 produces a pulse b shown in FIG. 9(B) through a first bit output terminal $O_1$, and produces a pulse c shown in FIG. 9(C) through a second bit output terminal $O_2$. The pulses b and c are supplied to an AND circuit 43 which produces a pulse d shown in FIG. 9(D). The counter 42 is reset by this pulse d. As clearly seen from FIGS. 9(A) and 9(D), the repetition frequency of the pulse d is equal to 15 Hz. Hence, the AND circuit 43 produces one pulse d as a reset pulse, every time the rotary body 11 undergoes three revolutions as will be described later on in the specification. This means that the pulse d will be produced with an interval of four fields.

Figure 9:
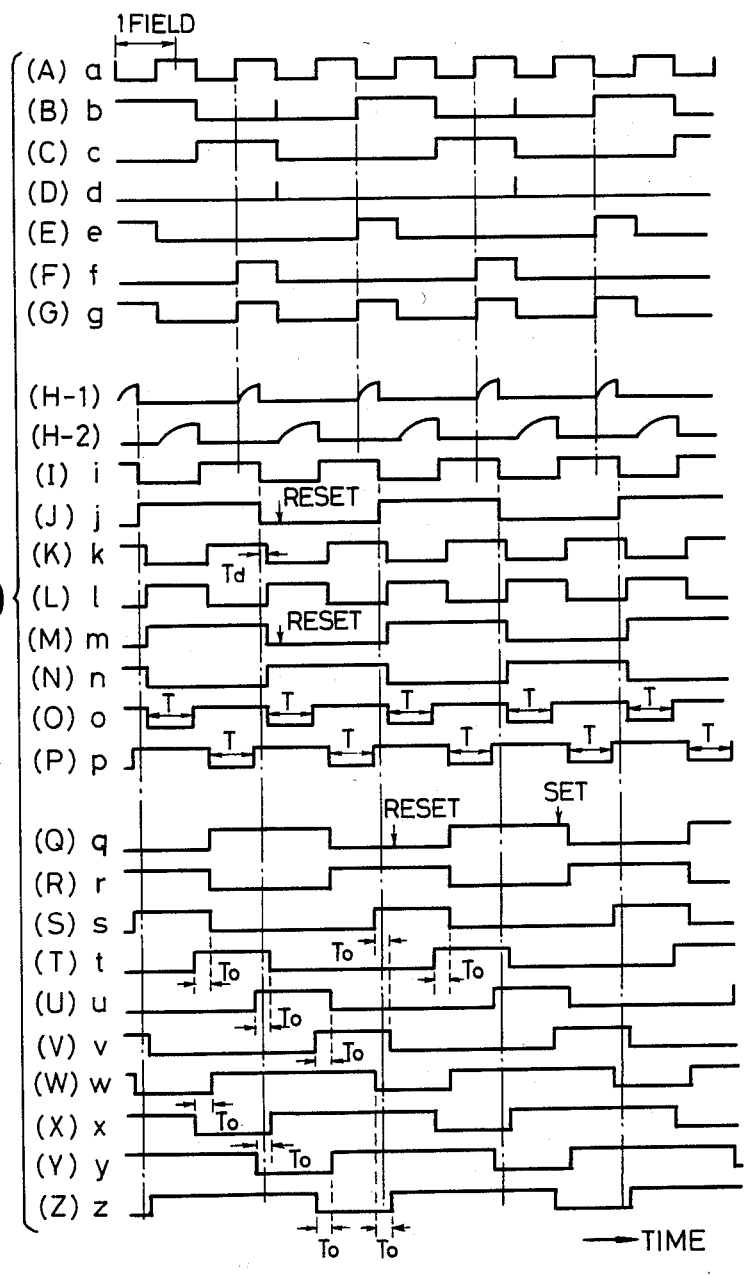
FIGS. 9(A) through 9(Z) respectively are time charts for explaining the operation of the circuit system shown in FIG. 8.

On the other hand, the pulse a is supplied to an AND circuit 44, together with the pulse c. The AND circuit 44 produces a pulse f shown in FIG. 9(F) which has a repetition frequency of 15 Hz. The pulse a is also inverted in an inverter 45 and then supplied to an AND circuit 46, together with the pulse b. The AND circuit 46 produces a pulse e shown in FIG. 9(E) which has a repetition frequency of 15 Hz. The pulses e and f are supplied to an OR circuit 47 which produces a pulse g shown in FIG. 9(G). This pulse g has a repetition frequency of 30 Hz. The pulse g is supplied to a monostable multivibrator 48, to trigger the monostable multivibrator 48 by a leading edge of the pulse g. At the same time, the pulse g is also supplied to a monostable multivibrator 49, to trigger the monostable multivibrator 49 by a trailing edge of the pulse g. As a result, the signal waveforms in each of charging and discharging capacitors within the monostable multivibrators 48 and 49, become as shown in FIGS. 9(H-1) and 9(H-2). Output pulses of the monostable multivibrators 48 and 49 are respectively applied to a flip-flop 50 as a reset pulse and a set pulse. Accordingly, the flip-flop 50 produces the square wave i shown in FIG. 9(I). Time constants of the monostable multivibrators 48 and 49 are adjusted so that the output signal i of the flip-flop 50 becomes a symmetrical square wave having a duty cycle of 50%.

The above symmetrical square wave i having the repetition frequency of 30 Hz, is applied to the input terminal 30 shown in FIG. 5 through an output terminal 51, and is hence supplied to the switching circuits 28 and 29. The square wave i is also supplied to a $\frac{1}{2}$-frequency divider 52 and to a delay circuit 54. The frequency divider 52 is reset by the pulse d. The frequency divider 52 frequency-divides the square wave i by ½, and produces the symmetrical square wave j shown in FIG. 9(J) which has a repetition frequency of 15 Hz. This square wave j is applied to the input terminal 31 shown in FIG. 5 through an output terminal 53, and is thus supplied to the switching circuit 32 as a switching signal.

The pulses i and j are used for switching the reproduced signals. On the other hand, switching signals for switching the recording current (video signal which is to be recorded) which is supplied to the heads HA through HD upon recording, are formed as follows. When the video signal of only one field is recorded on one track on the tape 12, the reproduced video signal may drop out or partly overlap in the vicinity of a boundary between the adjacent fields when the interchanged reproduction is carried out. Thus, in order to prevent such dropout or partial overlap of the reproduced video signal by carrying out the overlap recording, the tape 12 is wrapped around the peripheral surface of the rotary body 11 over an angular range which is larger than 270° by an angle (in the order of 20°, for example) which corresponds to recording portions which are to overlap. In addition, the recording current is supplied to each of the heads for a period which is slightly longer than one field. However, in order to achieve this, the switching signals for switching the recording current must also overlap.

Figure 10:
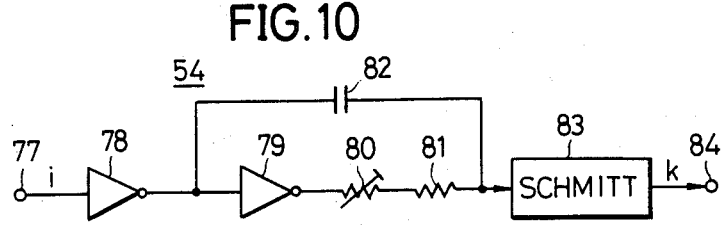
FIG. 10 is a systematic circuit diagram showing an embodiment of a delay circuit in the circuit system shown in FIG. 8.

Accordingly, the delay circuit 54 delays the square wave i to obtain a symmetrical square wave k shown in FIG. 9(K) which has a repetition frequency of 30 Hz. In FIG. 9(K), the delay time of the delay circuit 54 is represented by Td. The delay time Td is selected to a time in the range of 1.2 msec, for example. The delay circuit 54 has a circuit construction shown in FIG. 10, for example. In FIG. 10, the square wave i which is applied to an input terminal 77, is inverted in an inverter 78. An output signal of the inverter 78 is then passed through a delay circuit part which is made up from an inverter 79, a variable resistor 80, a resistor 81, and a capacitor 82. An output signal of this delay circuit part is supplied to a Schmitt trigger circuit 83 wherein the signal is subjected to waveformshaping. This circuit 83 produces the symmetrical square wave k through an output terminal 84.

The square wave k is inverted in an inverting circuit 55 shown in FIG. 8, and formed into a signal l shown in FIG. 9(L). This signal l is supplied to a ½-frequency divider 56 wherein the signal is frequency-divided by ½. The frequency divider 56 is reset by the pulse d. The frequency divider 56 produces a symmetrical square wave m shown in FIG. 9(M) which has a repetition frequency of 15 Hz. The switching sequence of the heads is determined by the resetting timing of the frequency divider 56, that is, with respect to the edge of the pulse d, because the frequency divider 56 is reset by the pulse d. The square wave m is inverted in an inverting circuit 57, and formed into a symmetrical square wave n shown in FIG. 9(N) of an inverted phase. This square wave n is supplied to an AND circuit 63. The square wave m is also supplied to an AND circuit 64 and to a differentiating circuit 58. The differentiating circuit 58 detects a leading edge in the square wave m, and applies a reset pulse to a ½-frequency divider 59. The frequency divider 59 may be set by the pulse d.

The frequency divider 59 produces a symmetrical square wave q shown in FIG. 9(Q) which has a repetition frequency of 15 Hz. This square wave q is supplied to an AND circuit 66. The square wave q is inverted in an inverting circuit 62 and formed into a symmetrical square wave r shown in FIG. 9(R), and this square wave r is supplied to an AND circuit 65. A monostable multivibrator 60 which is triggered by a trailing edge of the delayed symmetrical square wave k, produces a pulse o shown in FIG. 9(O). As shown in FIG. 9(O), the pulse o assumes a low level only for a predetermined period T from the trailing edge of the square wave k. The pulse o is supplied to the AND circuits 63 and 64. On the other hand, a monostable multivibrator 61 is triggered by a leading edge of the square wave k, and produces a pulse p shown in FIG. 9(P) which assumes a low level only for a predetermined period T from the leading edge of the square wave k. This pulse p is supplied to the AND circuits 65 and 66.

A recording/reproducing mode signal which is obtained through an input terminal 67, is applied to one of two input terminals in each of exclusive-OR circuits 68, 69, 70, and 71. On the other hand, output signals of the AND circuits 65, 64, 66, and 63 are respectively applied to the other of the two input terminals in each of the exclusive-OR circuits 68, 69, 70, and 71. The above recording/reproducing mode signal assumes a low level during the recording mode, and assumes a high level during the reproducing mode. Accordingly, during the recording mode, the exclusive-OR circuits 68, 69, 70, and 71 respectively produce the pulses s, t, u, and v shown in FIGS. 9(S), 9(T), 9(U), and 9(V), through output terminals 72, 73, 74, and 75. As shown in FIGS. 9(S) through 9(V), each of the pulses s, t, u, and v has a repetition frequency of 15 Hz, and has a pulse width which corresponds to the tape scanning period of the head inclusive of the overlap recording period described before. During a predetermined period To which is immediately prior to the trailing edge in each of the pulses s, t, u, and v, and during a predetermined period To from the leading edge in each of the pulses s, t, u, and v, each of these pulses s, t, u, and v assumes a high level.

On the other hand, during the reproducing mode, a high-level signal is applied to the input terminal 67. Thus, the pulses w, x, y, and z shown in FIGS. 9(W), 9(X), 9(Y), and 9(Z), are respectively produced through the output terminals 72, 73, 74, and 75. The pulses w, x, y, and z respectively have inverted phases of the pulses s, t, u, and v.

During the recording mode, the pulses s, t, u, and v are independently applied to the switches $S_{RA}$, $S_{RB}$, $S_{RC}$, and $S_{RD}$ shown in FIG. 5, as switching signals. Further, during the reproducing mode, the pulses w, x, y, and z are independently applied to the switches $S_A$, $S_B$, $S_C$, and $S_D$ shown in FIG. 5, as switching signals.

Figure 11:
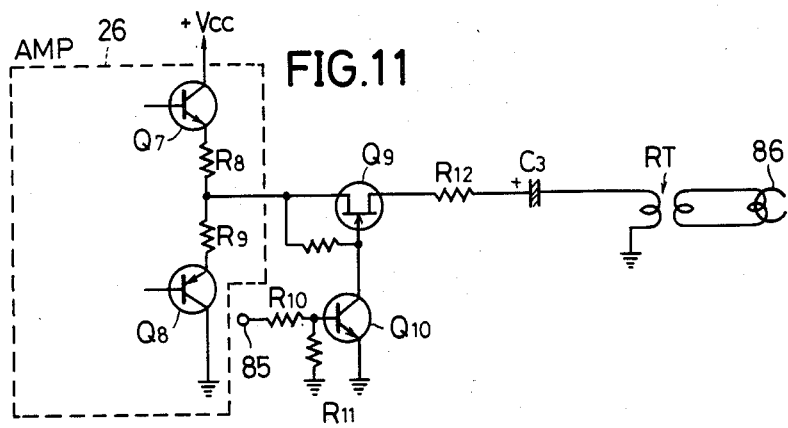
FIG. 11 is a circuit diagram showing another embodiment of an essential part of the system according to the present invention.

Next, description will be given with respect to an embodiment of an essential part of the system according to the present invention, by referring to FIG. 11. In FIG. 11, an NPN-type transistor $Q_7$ and a PNP-type transistor $Q_8$ are output stage transistors in the recording amplifier 26. The video signal which is to be recorded, which is obtained through a connection point between resistors $R_8$ and $R_9$, is applied to a drain of a field-effect transistor (FET) $Q_9$. During a period which is slightly longer than one field in which a video head 86 (this video head is one of the four video heads HA through HD), an NPN-type transistor $Q_{10}$ is turned ON by a high-level signal (one of the pulses s through v described before) which is applied to an input terminal 85 and then subjected to voltage division by resistors $R_{10}$ and $R_{11}$. Consequently, the FET $Q_9$ is also turned ON. Accordingly, the video signal which is to be recorded, passes through the FET $Q_9$, a resistor $R_{12}$, a capacitor $C_3$, and a rotary transformer RT, and is then supplied to the head 86.

Four of such a circuit shown in FIG. 11, are respectively provided in the transmission paths which are provided with respect to the four heads for the recording signal. In addition, the FET $Q_9$ in the circuit shown in FIG. 11 and other three FET transistors which are provided in the three circuits which are identical to the circuit shown in FIG. 11, are controlled of their ON and OFF states in a similar manner as in the case of the transistors $Q_{2A}$ through $Q_{2D}$ shown in FIG. 6. It is therefore possible to carry out the overlap recording.

Conventionally, a resistor having a resistance in the order of 1 kΩ was coupled between the emitters (or source) of the transistors $Q_{2A}$ through $Q_{2D}$ (or $Q_9$) which make up the analog switch and ground, however, such a resistor is omitted in the embodiments described heretofore. As a result, it is possible to reduce the number of circuit parts which are required in the VTR. Further, it is possible to prevent complete discharge of the capacitors $C_{1A}$ through $C_{1D}$ (or $C_3$) and therefore prevent discharge currents from flowing to the rotary transformers $RT_A$ through $RT_D$ (or RT), when the above analog switch is switched from the ON state to the OFF state. Moreover, because the analog switch is switched at a high speed and the above capacitors $C_{1A}$ through $C_{1D}$ (or $C_3$) will not discharge completely, it is possible to maintain the D.C. value of the output of the analog switch substantially constant.

Figure 12:
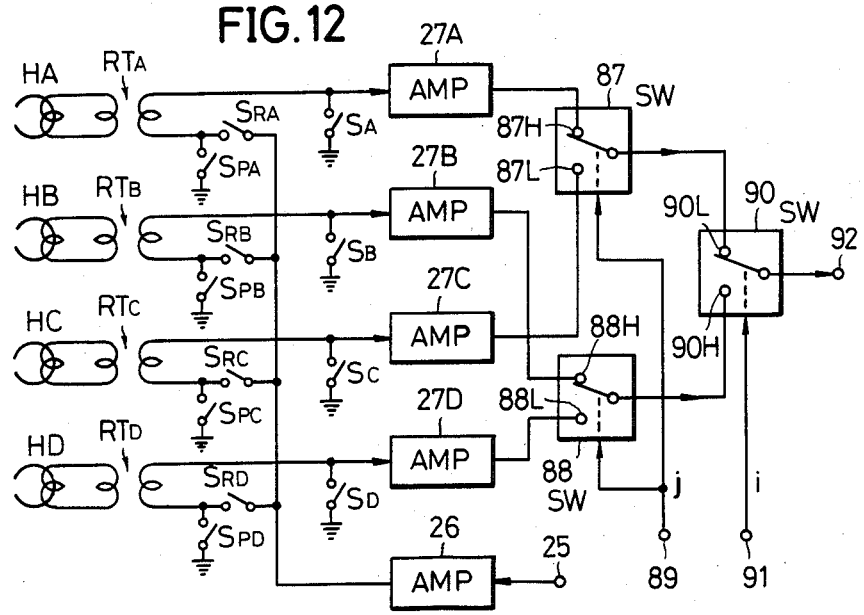
FIG. 12 is a systematic block diagram showing a second embodiment of a system according to the present invention.

Next, description will be given with respect to a second embodiment of a recording/reproduced signal switching system according to the present invention, by referring to FIG. 12. In FIG. 12, those parts which are the same as those corresponding parts in FIG. 5 are designated by the same reference numerals, and their description will be omitted. In FIG. 12, switching circuits 87 and 88 are respectively controlled by the pulse j which is applied to an input terminal 89. During two field periods in which the pulse j assumes a high level, the switching circuits 87 and 88 respectively and selectively produce the reproduced signals from the heads HA and HB which are applied to terminals 87H and 88H. On the other hand, during two field periods in which the pulse j assumes a low level, the switching circuits 87 and 88 respectively and selectively produce the reproduced signals from the heads HC and HD which are applied to terminals 87L and 88L. The output signal of the switching circuit 87 is applied to a terminal 90L of a switching circuit 90, while the output signal of the switching circuit 88 is applied to a terminal 90H of the switching circuit 90. The switching circuit 90 is controlled by the pulse i which is applied to an input terminal 91. During one field period in which the pulse i assumes a high level, the switching circuit 90 selectively produces the reproduced signal from the head HB or HD which is applied to the terminal 90H. On the other hand, during one field period in which the pulse i assumes a low level, the switching circuit 90 selectively produces the reproduced signal from the head HA or HC which is applied to the terminal 90L. Accordingly, in this second embodiment, the reproduced signals of one field are obtained from the heads HA through HD in a sequence HA→HB→HC→HD→HA→ . . . , and successively produced through an output terminal 92 as in the case of the first embodiment described previously, because the pulses i and j are in a phase relationship shown in FIGS. 9(I) and 9(J).

Figure 13:
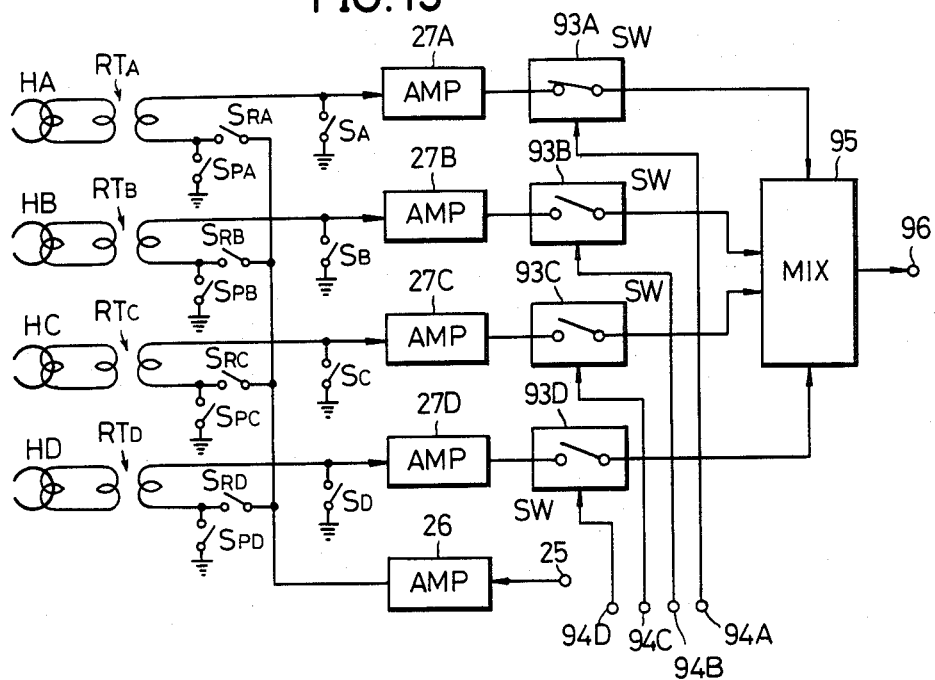
FIG. 13 is a systematic block diagram showing a third embodiment of a system according to the present invention.

Next, description will be given with respect to a third embodiment of a recording/reproduced signal switching system according to the present invention, by referring to FIG. 13. In FIG. 13, those parts which are the same as those corresponding parts in FIG. 5 are designated by the same reference numerals, and their description will be omitted. The reproduced signals from the video heads HA through HD are independently supplied to switching circuits 93A, 93B, 93C, and 93D. The switching circuits 93A through 93D are respectively designed to pass the signals supplied thereto, during a high level period of corresponding switching pulses shown in FIGS. 15(A), 15(B), 15(C), and 15(D) which are applied to input terminals 94A, 94B, 94C, and 94D.

Figure 14:
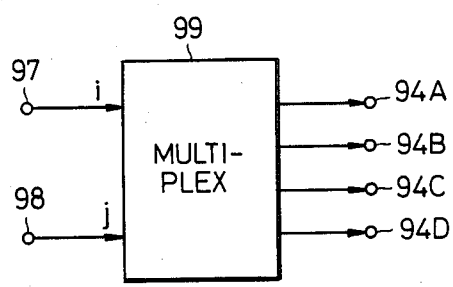
FIG. 14 is a systematic block diagram showing an example of a switching pulse generating circuit employed in the block system shown in FIG. 13.
Figure 15:
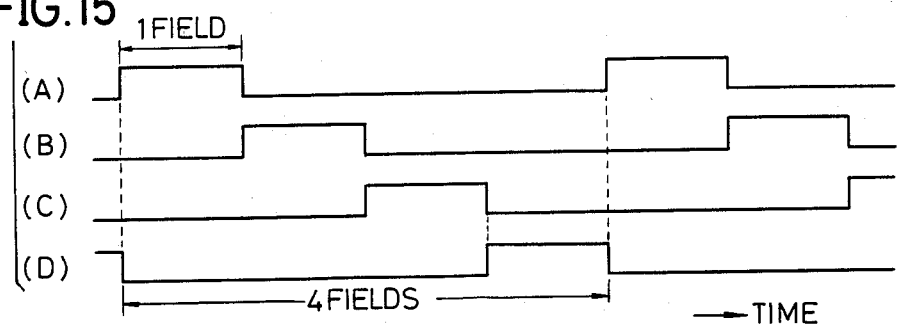
FIGS. 15(A) through 15(D) are graphs respectively showing signal waveforms of output switching pulses of the block system shown in FIG. 14.

The four kinds of switching pulses shown in FIGS. 15(A) through 15(D) are formed in the following manner. The pulse i shown in FIG. 9(I) which is in synchronism with the rotational phase of the rotary body 11 and has a period which is equal to 3/2 times the rotational period of the rotary body 11 (1/30 seconds, for example), is applied to a multiplexer 99 through an input terminal 97 shown in FIG. 14. On the other hand, the pulse j shown in FIG. 9(J) which is in synchronism with the rotational phase of the rotary body 11 and has a period which is equal to three times the rotational period of the rotary body 11 (1/15 seconds, for example), is applied to the multiplexer 99 through an input terminal 98.

The multiplexer 99 is made up from logic circuits. The multiplexer 99 forms the four kinds of switching pulses shown in FIGS. 15(A) through 15(D) which respectively have a duty cycle of 25% with phases mutually differing by 90°, and have a period identical to the period of the pulse i (a period of four fields, for example), from the pulses i and j. These four kinds of switching pulses which are produced from the multiplexer 99, are supplied in parallel to the terminals 94A through 94D.

Accordingly, the switching circuit 93A is controlled so as to pass the input signal while the head HA is scanning over the video track. Similarly, the switching circuits 93B, 93C, 93D, 93A, . . . are successively controlled to pass the input signals, for every one field period. The reproduced signals which are successively passed through the switching circuits 93A, 93B, 93C, 93D, 93A, . . . , are passed through a mixing circuit 95 and then produced through an output terminal 96. Thus, in this third embodiment, the reproduced signals of one field are obtained from the heads HA through HD in a sequence HA→HB→HC→HD→HA→ . . . , and multiplexed and produced through the output terminal 96 as in the case of the first and second embodiments described previously.

Figure 16:
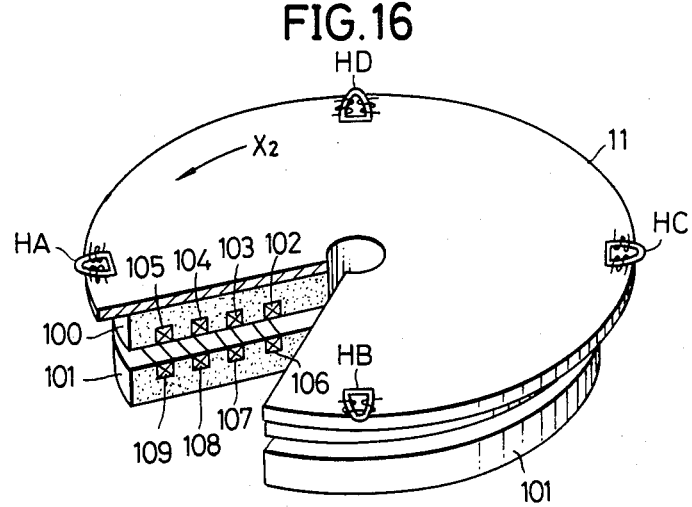
FIG. 16 is a perspective view, with a part cut away, showing an embodiment of the construction of a rotary transformer in the recording and reproducing apparatus which is applied with the system according to the present invention.

The signals supplied to and received from the heads HA through HD, respectively pass through the rotary transformers $RT_A$ through $RT_D$. Hence, description will now be given with respect to the construction of the rotary transformers which are employed in the system according to the present invention, by referring to FIG. 16. In FIG. 16, those parts which are the same as those corresponding parts in FIG. 1 are designated by the same reference numerals. A disc-shaped rotatable core 100 is fixed to the bottom surface of the rotary body 11. Further, a disc-shaped stationary core 101 is arranged opposing the rotatable core 100, with a slight gap formed between the two cores 100 and 101.

Ring-shaped coils 102, 103, 104, and 105 are respectively embedded in four grooves which are concentrically formed in the bottom surface of the rotatable core 100. On the other hand, ring-shaped coils 106, 107, 108, and 109 are respectively embedded in four grooves which are concentrically formed in the upper surface of the stationary core 101, at locations opposing the ring-shaped coils 102, 103, 104, and 105 in the rotatable core 100. During the recording and reproducing modes, the rotatable core 100 rotates unitarily with the rotary body 100, however, the stationary core 101 is constantly stationary. The transmission and reception of signals during the recording and reproducing modes are performed between the pairs of ring-shaped coils 102 and 106, 103 and 107, 104 and 108, and 105 and 109, and the rotary transformers $RT_A$ through $RT_D$ described before are made up from these four pairs of ring-shaped coils.

In the case of the first embodiment, the ring-shaped coil 102 is coupled to the head HA, the ring-shaped coil 103 to the head HC, the ring-shaped coil 104 to the head HB, and the ring-shaped coil 105 to the head HD, for example. Thus, the ring-shaped coils 102 and 104 which are respectively coupled to the heads HA and HB are located at separated positions in the rotatable core 100, and similarly, the ring-shaped coils 103 and 105 are respectively located at separated positions in the rotatable core 100. Therefore, it is possible to prevent crosstalk between the heads HA and HB and between the heads HC and HD, at outputs of the switching circuits 28 and 29 shown in FIG. 5.

In the case of the second embodiment, the ring-shaped coils 102, 103, 104, and 105 are respectively coupled to the heads HA, HB, HC, and HD, for example. Accordingly, as in the case of the first embodiment described above, it is possible to prevent crosstalk between the heads HA and HC and between the heads HB and HD, at outputs of the switching circuits 87 and 88 shown in FIG. 12.

Next, description will be given with respect to the construction and operation of a tape driving system employed in the VTR which is applied with the system according to the present invention, by referring to FIG. 17. During intermittent recording or insert recording, the tape travel is stopped or the tape travel is resumed in phase with the switching signals which are generated in the system according to the present invention.

Figure 17:
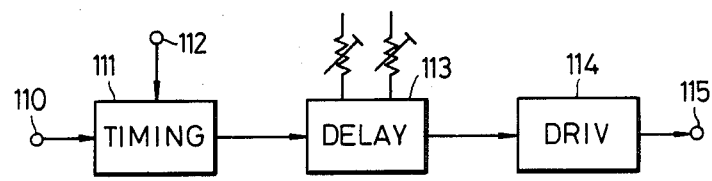
FIG. 17 is a systematic block diagram showing an example of another essential part of the recording and reproducing apparatus which is applied with the system according to the present invention.
Figure 18:
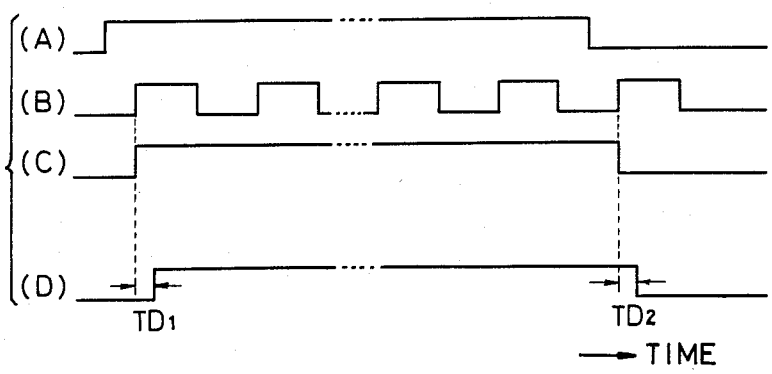
FIGS. 18(A) through 18(D) respectively are time charts for explaining the operation of the block system shown in FIG. 17.

It will now be assumed that a pause command signal shown in FIG. 18(A) is supplied to a timing circuit 111 through an input terminal 110 shown in FIG. 17. When the pause command signal is supplied to the timing circuit 111, the timing circuit 111 produces a high-level pause signal shown in FIG. 18(C) at a leading edge of a head switching signal shown in FIG. 18(B) which is applied to an input terminal 112. If the rotational speed of the rotary body 11 is equal to 45 rps, the symmetrical square wave i shown in FIG. 9(I) which has a repetition frequency of 30 Hz and is formed from the pulse d shown in FIG. 9(D), is used as the above head switching signal. The pulse d is in phase with a signal which is obtained by frequency-dividing the vertical synchronizing signal in the video signal which is to be recorded by ¼, and the symmetrical square wave i is formed from the pulse d. As a result, the timing of the intermittent recording and insert recording is determined by the above pulse d which has the repetition frequency of 15 Hz.

Figure 19:
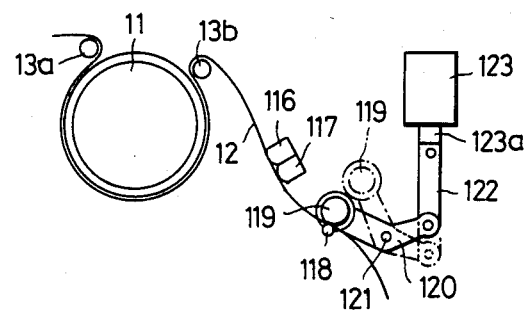
FIG. 19 is a general view showing an example of a tape driving system of the recording and reproducing apparatus which is applied with the system according to the present invention.

The pause signal shown in FIG. 18(C) which is produced from the timing circuit 111, is delayed by a predetermined time $TD_1$ in a delay circuit 113. An output delayed signal of the delay circuit 113 is supplied to a solenoid driver 114. An output signal of this driver 114 is applied to a plunger solenoid 123 shown in FIG. 19 through an output terminal 115, to turn the plunger solenoid 123 OFF. Thus, a plunger 123a of the plunger solenoid 123 shown in FIG. 19 is caused to project outwards. Accordingly, as indicated by a one-dot chain line in FIG. 19, a lever 120 which is linked with an arm 122 which is connected to the plunger 123a, rotates clockwise in FIG. 19 about a pin 121. Hence, a pinch roller 119 which is provided on the lever 121, separates from a capstan 118. The tape 12 stops traveling after the predetermined delay time $TD_1$ from the leading edge of the head switching pulse i.

On the other hand, when a pause cancel operation is carried out, a low-level signal is applied to the input terminal 110 shown in FIG. 17. The timing circuit 111 thus produces a signal which assumes a low level in phase with the leading edge of the head switching pulse. This low-level signal which is produced from the timing circuit 111, is delayed by a predetermined delay time $TD_2$ in the delay circuit 113, and then subjected to voltage amplification in the solenoid driver 114. The output signal of the solenoid driver 114 is applied to the plunger solenoid 123 through the output terminal 115, to turn the plunger solenoid 123 ON. Accordingly, the plunger 123a is drawn inwards, and the lever 120 rotates counterclockwise in FIG. 19 about the pin 121. As a result, the pinch roller 119 presses against the rotating capstan 118 as indicated by a solid line in FIG. 19, in a state where the tape 12 is pinched between the pinch roller 119 and the capstan 118.

Accordingly, the tape 12 which is wrapped around the peripheral surface of the rotary body 11 over an angular range which is slightly larger than 270°, makes contact with an audio erasing head 116 and an audio and control head 117, and is then pinched between the capstan 118 and the pinch roller 119 as shown in FIG. 19, resumes traveling after the predetermined time delay $TD_2$ from the leading edge of the head switching pulse i which is obtained after the pause mode is cancelled.

The above delay times $TD_1$ and $TD_2$ are respectively set in order to compensate for delays in the operations which are carried out by the mechanisms, and to determine where the input signals are to be connected. Therefore, even during the intermittent recording and insert recording when the recording is carried out discontinuously with respect to time, it is possible to record the discontinuous control pulses with a constant phase.

Description was heretofore given with respect to the recording and reproduction of the video signal which has the field frequency of 60 Hz (or 59.94 Hz). However, when recording and reproducing one field of a video signal which has a field frequency of 50 Hz onto or from successive tracks on the tape 12, the repetition frequency of the pulse d becomes equal to 12.5 Hz because the rotary body 11 rotates at a rotational speed of 37.5 rps in this case.

Figure 20:
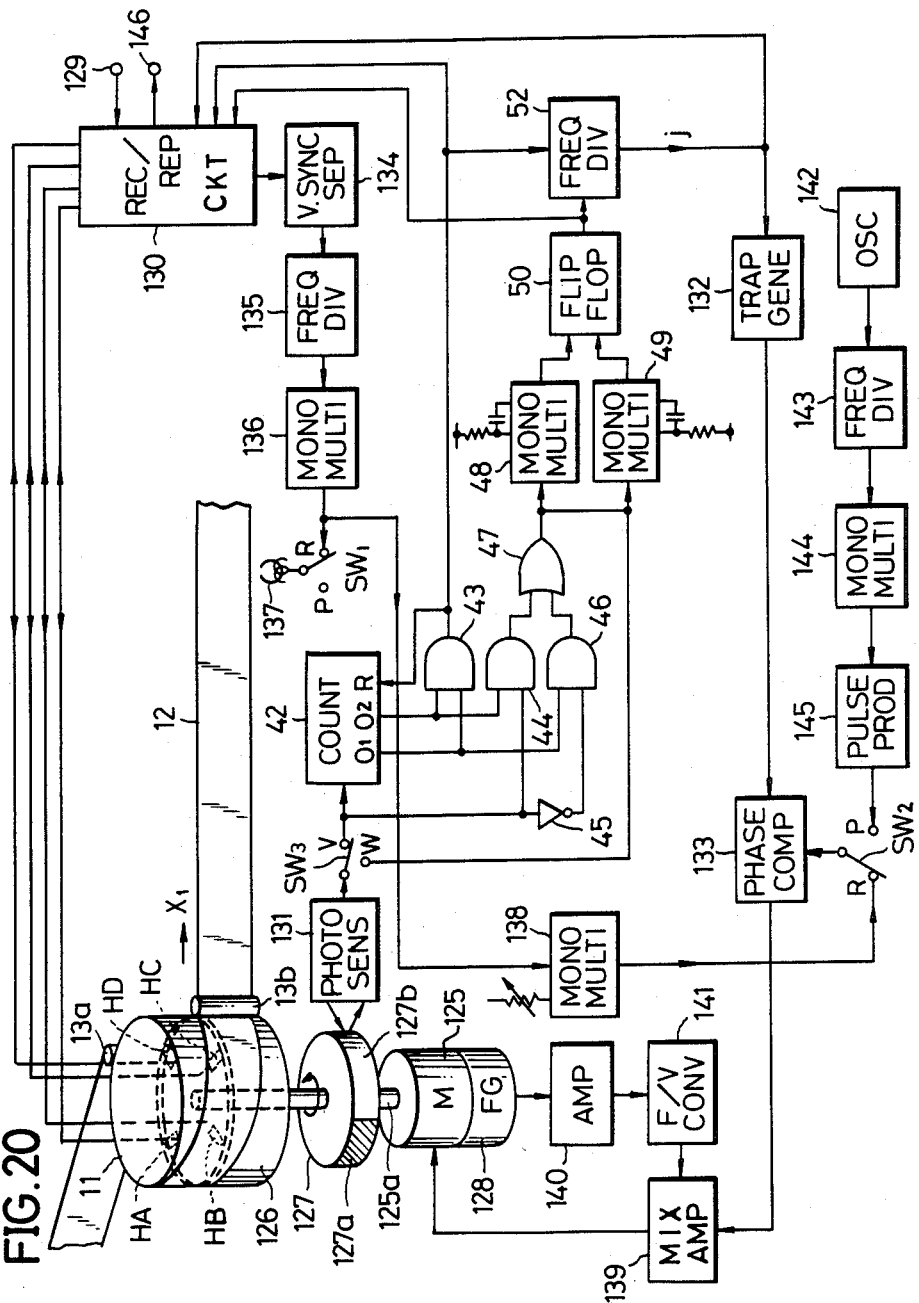
FIG. 20 is a systematic block diagram showing an example of a head servo circuit in the recording and reproducing apparatus which is applied with the system according to the present invention.

Next, description will be given with respect to a head servo circuit in the VTR which is applied with the system according to the present invention, by referring to FIGS. 20 and 21(A) through 21(G). In FIG. 20, those parts which are the same as those corresponding parts in FIG. 8 are designated by the same reference numerals, and their description will be omitted. The servo circuit controls the rotary body 11 to rotate at a constant speed, by using the switching signal which is generated in the system according to the present invention as a comparison signal.

In FIG. 20, a tip end of a rotary shaft 125a of a head motor 125, penetrates a central part of a stationary drum 126, and is fixed to a central part of the rotary body (rotary drum) 11. Further, a disc 127 is fixed to the rotary shaft 125a between the motor 125 and the stationary drum 126, in a state where the rotary shaft 125a penetrates a central part of the disc 127. The video heads HA through HD are respectively provided on the rotary body 11, and a predetermined gap is formed between the bottom surface of the rotary body 11 and the top surface of the stationary drum 126. In addition, a light absorbing portion 127a is formed on the outer peripheral surface of the disc 127 over an angular range of 180°, and a light reflecting portion 127b is formed on the remaining outer peripheral surface of the disc 127 over an angular range of 180°. A frequency generator (FG) 128 generates a signal having a frequency which is proportional to the rotational speed of the motor 125.

First, description will be given with respect to the operation of the servo circuit during the recording mode. During the recording mode, switches $SW_1$ and $SW_2$ are respectively connected to contacts R. In addition, during the recording mode and during the reproducing mode which will be described later, a switch $SW_3$ is connected to a contact V in the case of the 4-head type VTR and connected to a contact W in the case of the 2-head type VTR. In the present embodiment, the switch $SW_3$ is connected to the contact V because the four heads HA through HD are provided on the rotary body 11.

For example, a standard system color video signal which is to be recorded, is supplied to a recording and reproducing circuit 130 through an input terminal 129. The format of the video signal is converted into a known signal format which is suited for magnetic recording and reproduction, in the recording and reproducing circuit 130. The converted video signal of one field period (actually, a period which is slightly longer than one field period because the overlap recording method described previously is employed) is selectively and successively supplied to the heads HA through HD, and the converted video signal is recorded in the tape pattern shown in FIG. 3.

Figure 21:
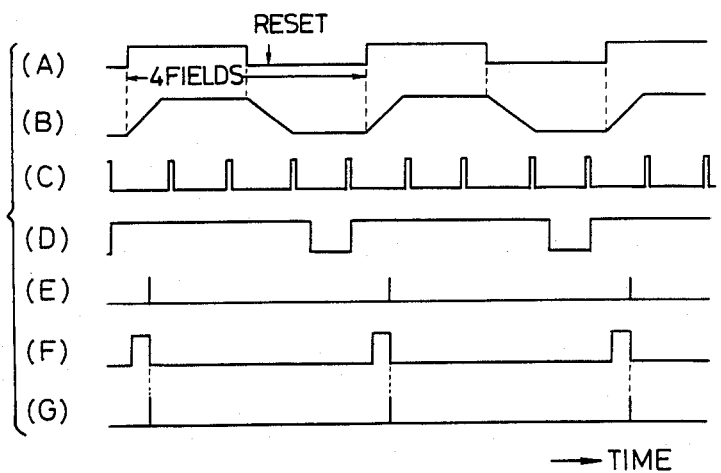
FIGS. 21(A) through 21(G) respectively are time charts for explaining the operation of the block system shown in FIG. 20.

On the other hand, the rotary body 11 and the motor 125 are rotating at the rotational speed of 45 rps, for example, as described before. Thus, the square wave a shown in FIG. 9(A) which has a duty cycle of 50% and a repetition frequency of 45 Hz, is obtained from a photosensor 131. This square wave a is supplied to the counter 42 wherein the pulses are counted. The symmetrical square wave j which is obtained from the frequency divider 52, has a period (four fields) which is equal to three times the rotational period of the rotary body 11 as shown in FIGS. 9(J) and 21(A). As described previously, this square wave j is supplied to switching circuits within the recording and reproducing circuit 130 as a switching signal.

The square wave j is supplied to a trapezoidal wave generating circuit 132 wherein the square wave j is converted into a trapezoidal wave shown in FIG. 21(B). This trapezoidal wave has a repetition frequency of 15 Hz, and is in synchronism with the rotational phase of the rotary body 11. The trapezoidal wave is applied to a phase comparator 133 as a comparison signal in a phase control loop within the head servo circuit.

A reference signal in the above phase control loop, is formed in the following manner. First, the vertical synchronizing signal in the video signal having the field frequency of 60 Hz (or 59.94 Hz) is separated in a vertical synchronizing signal separating circuit 134. An output separated signal shown in FIG. 21(C) which is produced from the separating circuit 134, is frequency-divided by $\frac{1}{4}$ in a $\frac{1}{4}$-frequency divider 135, and converted into a pulse which has a repetition frequency of 15 Hz as shown in FIG. 21(D). This pulse shown in FIG. 21(D), is subjected to waveform-shaping in a monostable multivibrator 136, and then supplied to a control head 137 through the switch $SW_1$ so as to be recorded on the tape 12 as the control signal. On the other hand, the pulse shown in FIG. 21(D) is also supplied to a monostable multivibrator 138 wherein the pulse is converted into a pulse shown in FIG. 21(E). This pulse shown in FIG. 21(E) is supplied to the phase comparator 133 through the switch $SW_2$ as the reference signal. The phase and the pulse width of the pulse shown in FIG. 21(D), are adjusted by the monostable multivibrators 136 and 138.

The phase comparator 133 repeats an operation in which, the sloping portion of the trapezoidal wave shown in FIG. 21(B) is sampled by the pulse shown in FIG. 21(E) which is supplied thereto as the reference signal, and a voltage which is obtained by this sampling is held for approximately four fields until a subsequent pulse shown in FIG. 21(E) is supplied thereto. The voltage which is obtained by the sampling and holding in the phase comparator 133, is supplied to a mixing amplifier 139 as a phase error signal. On the other hand, the A.C. signal from the known frequency generator 128 (FG), which has a frequency proportional to the rotational speed of the motor 125, is supplied to a frequency-to-voltage (F/V) converter 141 through an amplifier 140. The A.C. signal supplied to the F/V converter 141 is subjected to a frequency-to-voltage conversion, and the converted signal is supplied to the mixing amplifier 139 as a speed error signal. The phase error signal and the speed error signal which are obtained from the mixing amplifier 139 are respectively applied to the motor 125. Accordingly, the rotational speed of the motor 125 is controlled to a constant rotational speed of 45 rps, and the rotational phase of the motor 125 is also controlled to a constant phase.

Next, description will be given with respect to the operation of rhe head servo circuit during the reproducing mode. During the reproducing mode, a trapezoidal wave (a trapezoidal wave having an inverted phase of the trapezoidal wave obtained during the recording mode, for example) which is synchronized with the rotational phase of the rotary body 11 and the motor 125, is supplied to the phase comparator 133 from the trapezoidal wave generating circuit 132 as in the case upon recording. On the other hand, during the reproducing mode, the switches $SW_1$ and $SW_2$ are respectively connected to contacts P. As a result, the signal which is supplied to the phase comparator 133 as the reference signal, is switched from the output signal of the monostable multivibrator 138 to the output signal of a pulse generating circuit 145. A pulse shown in FIG. 21(F) which has a repetition frequency of 15 Hz, is supplied to the pulse generating circuit 145. This pulse shown in FIG. 21(F) is obtained by frequency-dividing an output signal of an oscillator 142 in a frequency divider 143, and then delaying an output signal of the frequency divider 143 by a predetermined delay time in a monostable multivibrator 144. The pulse generating circuit 145 generates a pulse shown in FIG. 21(G) which is in phase with a trailing edge of the pulse shown in FIG. 21(F) and has a narrow pulse width.

The above pulse shown in FIG. 21(G) which has the repetition frequency of 15 Hz, is supplied to the phase comparator 133 as the reference signal, through the switch SW$_2$. Thus, the phase comparator 133 samples and holds the voltage at the sloping portion of the trapezoidal wave which is generated from the trapezoidal wave generating circuit 132, and produces the phase error voltage. This phase error voltage is passed through the mixing amplifier 139 and then applied to the motor 129 so as to control the rotational phase of the motor 129 to a constant phase. Therefore, the rotational phase of the rotary body 11 is also controlled, and the rotary body 11 is controlled to rotate at the constant rotational speed of 45 rps by the speed control loop which operates similarly as in the case upon recording.

The video signals which are successively reproduced from the tape 12 by the heads HA through HD which are provided on the rotary body 11 which rotates at the rotational speed of 45 rps, are supplied to the recording and reproducing circuit 130. As described previously, during the period in which the rotary body 11 rotates by an angle which is slightly larger than 270°, switching is successively performed so as to obtain the reproduced signal from only one of the three heads which simultaneously scan over the tape 12. Further, the reproduced signal which is obtained as a result of such successive switching, is converted into a video signal which is in conformance with the standard system before being produced through an output terminal 146.

Thus, an essential part (a circuit part comprising circuits 42 through 50 and 52 as shown in FIG. 20) of the switching pulse generating circuit shown in FIG. 8 which is employed in the system according to the present invention, may also be used as a part of the phase control loop in the head servo circuit. Further, in the head servo circuit shown in FIG. 20, a part of the above essential part of the switching pulse generating circuit may also be used to generate a comparison signal for a head servo circuit in the 2-head type VTR. When generating the comparison signal for the head servo circuit in the 2-head type VTR, the switch SW$_3$ is connected to the contact W. Moreover, a rotation detection pulse which is obtained by detecting the rotation of the rotary body which is provided with the two heads, is supplied to a moving contact of the switch SW$_3$. This rotation pulse has a period of two fields, and is supplied to the monostable multivibrators 48 and 49 through the switch SW. The monostable multivibrator 48 is triggered by a leading edge of the rotation detection pulse, and the monostable multivibrator 49 is triggered by a trailing edge of the rotation detection pulse.

In a case where one field of the video signal is recorded on one video track on the tape 12, the rotary body in the 2-head type VTR is rotated at a rotational speed of 30 rps when recording and reproducing the video signal which has a field frequency of 60 Hz (or 59.94 Hz). Thus, in this case, the above rotation pulse which is supplied to the moving contact of the switch SW$_3$, has a repetition frequency of 30 Hz. Accordingly, the repetition frequency of the output signal of the flip-flop 50 which is determined of its stable state by the output signals of the monostable multivibrators 48 and 49, also becomes equal to 30 Hz. Consequently, the repetition frequency of the output signal of the frequency divider 52, becomes equal to 15 Hz. Hence, the repetition frequency of the output signal of the trapezoidal wave generating circuit 132 which is supplied with the output signal of the frequency divider 52, becomes equal to 15 Hz which is the same as the repetition frequency in the case of the 4-head type VTR.

On the other hand, the repetition frequency of the pulse which is produced from the monostable multivibrator 138 as the reference signal for the phase control loop during the recording mode, is equal to 15 Hz which is the frequency of the signal which is obtained by frequency-dividing the vertical synchronizing signal by $\frac{1}{4}$. In addition, the repetition frequency of the pulse which is generated from the pulse generating circuit 145 as the reference signal during the reproducing mode, is also equal to 15 Hz which is the same as the repetition frequency obtained in the case of the 4-head type VTR. Therefore, an accurate phase error voltage can be obtained from the phase comparator 133 even in the case of the 2-head type VTR, and the rotational phase of the motor 125 can be controlled to a constant phase. In the case where the rotation detection signal is obtained from the 2-head type VTR, the time constants of the monostable multivibrators 48 and 49 are set to the same value.

In the speed control loop which is made up from the frequency generator 128, the amplifier 140, the F/V converter 141, the mixing amplifier 139, and the motor 125, the characteristics and the like of the F/V converter 141 are selected differently between the 4-head type VTR and the 2-head type VTR. This is because the rotary body in the 2-head type VTR rotates at a rotational speed (30 rps, for example) which is different from the rotational speed of the rotary body in the 4-head type VTR.

According to the present embodiment, the phase control loop in the head servo circuit may be used in common between the 2-head type VTR and the 4-head type VTR, by merely switching the switch SW$_3$ and changing the time constants of the monostable multivibrators 48 and 49. This feature is especially advantageous when the phase control loop is manufactured in the form of an integrated circuit.

In the embodiment described heretofore, description was given with respect to the recording and reproduction of the video signal which has the field frequency of 60 Hz (or 59.94 Hz). However, the the present invention can be applied similarly to the recording and reproduction of the video signal which has the field frequency of 50 Hz. In addition, in the embodiment described heretofore, the pulse which is formed from the output signal of the oscillator 142 is used as the reference signal for the phase control loop upon reproduction, which means that the phase of the trapezoidal wave which is in synchronism with the rotational phase of the rotary body 11 is indirectly compared with the phase of the reproduced control signal. However, the control signal which is reproduced by the control head 137 may be used as the reference signal for the phase control loop, to directly compare the phase of the above trapezoidal wave and the reproduced control signal. In this case, the repetition frequency of the reproduced control signal may be the same frequency as the vertical synchronizing signal, or $\frac{1}{2}$ the frequency of the vertical synchronizing signal, and in the latter case, the reproduced control signal may be frequency-divided so that the repetition frequency becomes equal to the repetition frequency of the above trapezoidal wave.

Further, the present invention is not limited to these embodiments, but various variations and modifications may be made without departing from the scope of the present invention.

What is claimed is:

1. A recording/reproduced signal switching system for a 4-head type recording and reproducing apparatus, said switching system comprising:

rotating means for rotating a rotary body at a rotational speed of 270° per unit, said unit being 1/n times one field of a video signal which is to be recorded onto and reproduced from a magnetic tape, said magnetic tape being wrapped around a peripheral surface of said rotary body over an angular range which is greater than or equal to 270° but less than 360°, said rotary body being mounted with four heads which are equally spaced apart so that adjacent heads are separated by 90°;

tape driving means for driving said magnetic tape to travel;

four rotary transformers for performing transmission and reception of signals with respect to said four heads;

four preamplifiers respectively supplied with reproduced signals from said four heads through said four rotary transformers which are provided correspondingly;

recording switch circuit means provided between an input terminal which is applied with the recording video signal which is to be recorded and one end of each of said four rotary transformers, for selectively and successively supplying the recording video signal to one of said four heads with a period which is approximately equal to a period in which said rotary body undergoes a 270° rotation;

first reproduction switch circuit means provided between the other end of each of said four rotary transformers and an input terminal of each of said four preamplifiers, for passing a reproduced signal from one of said four heads from which the reproduced signal is to be obtained among four reproduced signals from said four heads, and for subjecting the input terminals of three of said four preamplifiers which are coupled to the remaining three heads to A.C. grounding;

second reproduction switch circuit means for selectively and successively passing one of the four reproduced signals which are obtained through said four preamplifiers; and switching signal generating means for supplying switching signals to said recording switch circuit means and said first and second reproduction switch circuit means, said switching signals being formed based on a rotation detection pulse which is in synchronism with the rotational speed of said rotary body and is obtained from a part of said rotating means, said recording switch circuit means being made operative and said first reproduction switch circuit means subjecting all of the input terminals of said four preamplifiers to A.C. grounding in response to said switching signals during a recording mode of said recording and reproducing apparatus, said recording switch circuit means assuming a signal blocking state and said first and second reproduction switch circuit means being made operative in response to said switching signals during a reproducing mode of said recording and reproducing apparatus.

2. A recording/reproduced signal switching system as claimed in claim 1 in which said switching signal generating means comprises first frequency dividing means for frequency-dividing said rotation detection pulse so as to produce and supply to said second reproduction switch circuit means a first switching signal having a period which is approximately equal to 3/2 times one rotational period of said rotary body, second frequency dividing means for frequency-dividing said first switching signal by ½ so as to produce and supply a second switching signal to said second reproduction switch circuit means, and a pulse generating circuit supplied with said first and second switching signals, for producing four kinds of switching pulses respectively having a period which is equal to the period of said first switching signal and having a duty cycle of approximately 25% with phases which mutually differ by approximately 90°, said four kinds of switching pulses being supplied to said recording switch circuit means during the recording mode and to said first reproduction switch circuit means during the reproducing mode.

3. A recording/reproduced signal switching system as claimed in claim 2 in which said pulse generating circuit generates said four kinds of pulses so that, between two kinds of switching pulses which differ in phase by approximately 90°, a trailing edge of one of the two switching pulses with the leading phase is generated after a leading edge of the other of the two switching pulses with the lagging phase is generated.

4. A recording/reproduced signal switching system as claimed in claim 2 in which said four heads comprise first, second, third, and fourth heads which are mounted on said rotary body in this sequence so that said first head leads said second head with respect to a rotating direction of said rotary body, said second reproduction switch circuit means comprises a first switching circuit for alternately switching the reproduced signals from said first and second heads in response to said first switching signal, a second switching circuit for alternately switching the reproduced signals from said third and fourth heads in response to said first switching signal, and a third switching circuit for alternately switching output signals of said first and second switching circuits in response to said second switching signal, and said third switching circuit successively and cyclically produces the reproduced signals from said first, second, third, and fourth heads in this sequence.

5. A recording/reproduced signal switching system as claimed in claim 2 in which said four heads comprise first, second, third, and fourth heads which are mounted on said rotary body in this sequence so that said first head leads said second head with respect to a rotating direction of said rotary body, said second reproduction switch circuit means comprises a first switching circuit for alternately switching the reproduced signals from said first and third heads in response to said second switching signal, a second switching circuit for alternately switching the reproduced signals from said second and fourth heads in response to said second switching signal, and a third switching circuit for alternately switching output signals of said first and second switching circuits in response to said first switching signal, and said third switching circuit successively and cyclically produces the reproduced signals from said first, second, third, and fourth heads in this sequence.

6. A recording/reproduced signal switching system as claimed in claim 2 in which said four heads comprise first, second, third, and fourth heads which are mounted on said rotary body in this sequence so that said first head leads said second head with respect to a rotating direction of said rotary body, said second reproduction switch circuit means comprises first through fourth switching circuits for selectively and independently producing the reproduced signals from said first through fourth heads in response to said four kinds of switching signals, and said first through fourth switching circuits successively and cyclically produce the reproduced signals from said first, second, third, and fourth heads in this sequence.

7. A recording/reproduced signal switching system as claimed in claim 1 in which said tape driving means comprises means for temporarily stopping or resuming the tape travel, said means is supplied with one switching signal which is obtained from said switching signal generating means and has a period which is approximately equal to three times one rotational period of said rotary body and a command signal which commands the tape travel to be temporarily stopped or resumed during an insert recording mode or an intermittent recording mode, and said means temporarily stops or resumes the tape travel in phase with said one switching signal.

8. A recording/reproduced signal switching system as claimed in claim 1 in which two mutually opposing heads among said four heads have gaps of the same azimuth angle, and two mutually adjacent heads among said four heads have gaps of mutually different azimuth angles.

* * * * *